(12) United States Patent
Liu

(10) Patent No.: US 11,503,384 B2
(45) Date of Patent: Nov. 15, 2022

(54) METHODS AND SYSTEMS FOR CREATING PATTERNS FOR AN ADULT ENTERTAINMENT DEVICE

(71) Applicant: HYTTO PTE. LTD., Singapore (SG)

(72) Inventor: Dan Liu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 205 days.

(21) Appl. No.: 17/088,476

(22) Filed: Nov. 3, 2020

(65) Prior Publication Data

US 2022/0141550 A1 May 5, 2022

(51) Int. Cl.
| | |
|---|---|
| *H04N 21/8545* | (2011.01) |
| *H04N 21/81* | (2011.01) |
| *H04N 21/8547* | (2011.01) |
| *A61H 19/00* | (2006.01) |

(52) U.S. Cl.
CPC ......... *H04N 21/8545* (2013.01); *A61H 19/00* (2013.01); *H04N 21/8186* (2013.01); *H04N 21/8547* (2013.01)

(58) Field of Classification Search
CPC ........... H04N 21/8545; H04N 21/8186; H04N 21/8547; H04N 21/25891; H04N 21/4131; H04N 21/44227; H04N 21/47202; H04N 21/47205; H04N 21/47217; H04N 21/485; H04N 21/8133; H04N 21/854; H04N 21/41407; A61H 19/00; A61H 1/00
See application file for complete search history.

(56) References Cited

U.S. PATENT DOCUMENTS

| | | | |
|---|---|---|---|
| 4,196,461 A | 4/1980 | Geary | |
| 6,337,289 B1 | 1/2002 | Narwankar | |
| 6,652,347 B1 | 11/2003 | Stevkovski | |
| 7,386,134 B2 | 6/2008 | Engelsberg et al. | |
| 7,448,969 B2 | 11/2008 | Weber | |
| 10,303,935 B2 | 5/2019 | Carey | |
| 10,904,617 B1 * | 1/2021 | Labarre | ............... H04N 21/233 |
| 10,999,608 B2 * | 5/2021 | Liu | .................. H04N 21/47202 |
| 2002/0097229 A1 | 7/2002 | Rose et al. | |
| 2009/0146779 A1 * | 6/2009 | Kumar | .................. G08C 17/02 340/5.31 |

(Continued)

*Primary Examiner* — Oschta I Montoya
(74) *Attorney, Agent, or Firm* — Kanika Radhakrishnan; Evergreen Valley Law Group

(57) ABSTRACT

Methods and systems for creating patterns for an adult entertainment device are described. The method includes receiving a media play request initiated from a User Interface (UI) of media application installed on user device. The media play request includes selected media file. The UI includes plurality of pattern creation options. The method includes playing selected media file. The method includes facilitating creation of at least one pattern for media file while playing media file. The at least one pattern is created by user using at least one pattern creation option. The method further includes storing at least one pattern in corresponding at least one script file. The at least one pattern is transformed into corresponding intensity instruction signals. The intensity instruction signals are sent to adult entertainment device connected to user device to cause customization of adjustable parameters of adult entertainment device to be in synchronization with selected media file.

18 Claims, 15 Drawing Sheets

(56) References Cited

U.S. PATENT DOCUMENTS

| | | | |
|---|---|---|---|
| 2010/0275235 A1* | 10/2010 | Joo | H04N 7/165 |
| | | | 725/74 |
| 2013/0072834 A1* | 3/2013 | Afshar | A61H 1/00 |
| | | | 601/46 |
| 2017/0026674 A1* | 1/2017 | Bai | H04N 21/41407 |
| 2020/0253816 A1* | 8/2020 | Sloan | G06N 3/0454 |
| 2020/0366972 A1* | 11/2020 | Sloan | H04N 21/4751 |
| 2022/0141550 A1* | 5/2022 | Liu | H04N 21/485 |
| | | | 600/38 |

* cited by examiner

METHODS AND SYSTEMS FOR CREATING PATTERNS FOR AN ADULT ENTERTAINMENT DEVICE

TECHNICAL FIELD

Embodiments of the disclosure relate generally to a field of teledildonic pattern creation and, more particularly to, methods and systems for creating a pattern for a media file that causes customization of one or more adjustable parameters of an adult entertainment device to be in synchronization with the pattern(s) created for the media file.

BACKGROUND

Teledildonic is a way of performing virtual sex using technology to replicate human sexual interactions. Currently, a variety of teledildonic devices are available in the market that can be used by a person for replicating physical sensations. These devices help couples in experiencing sexual pleasures even though they are physically distant apart.

The teledildonic devices offer various features, such as voice control, vibration control, intensity control etc., to users using the device. Although, these features help in controlling the working of the device as per the need of the user, but these changes need to be performed manually by the user while using the device which can be irritating for the user.

Further, the teledildonic devices operate based on the instructions received from applications managing the devices. These instructions are designed in such a way that they help in enhancing feeling of pleasure in the user using the teledildonic device. Though these instructions are defined based on the requirement of general public, few users may not like the way of the operation of the device as there are only few ways available for the operation of the device. Few users may be interested in experiencing something new, every time they use the device.

Hence, there is a need of techniques that enable a user of the teledildonic device to control the working of the teledildonic device based on their own sexual requirements.

SUMMARY

Various embodiments of the present disclosure provide methods and systems for creating patterns for an adult entertainment device.

In an embodiment, a computer-implemented method is disclosed. The method includes receiving a media play request initiated from a User Interface (UI) of a media application installed on a user device. The media play request includes a selected media file. The UI includes a plurality of pattern creation options. The method includes playing the selected media file. The method includes facilitating creation of at least one pattern of a plurality of patterns for the selected media file while playing the selected media file. The at least one pattern is created by a user using at least one pattern creation option of the plurality of pattern creation options. The method further includes storing the at least one pattern of the selected media file in a corresponding at least one script file of a plurality of script files. The at least one pattern is transformed into corresponding one or more intensity instruction signals. The one or more intensity instruction signals are sent to an adult entertainment device communicably connected to the user device to cause customization of one or more adjustable parameters of the adult entertainment device to be in synchronization with the selected media file.

In another embodiment, a system is disclosed. The system includes a communication interface to receive a media play request initiated from a User Interface (UI) of a media application installed on a user device. The media play request includes a selected media file. The UI includes a plurality of pattern creation options. The system also includes a memory including executable instructions and a processor communicably coupled to the communication interface and configured to execute the instructions, thereby causing the system to play the selected media file. The system is further caused to facilitate creation of at least one pattern of a plurality of patterns for the selected media file while playing the selected media file. The at least one pattern is created by a user using at least one pattern creation option of the plurality of pattern creation options. The server system is further caused to store the at least one pattern of the selected media file in a corresponding at least one script file of a plurality of script files. The at least one pattern is transformed into corresponding one or more intensity instruction signals. The one or more intensity instruction signals are sent to an adult entertainment device communicably connected to the user device to cause customization of one or more adjustable parameters of the adult entertainment device to be in synchronization with the selected media file.

In yet another embodiment, a computer-implemented method is disclosed. The method includes receiving a media selection request initiated from a User Interface (UI) of a media application installed on a user device communicably connected to an adult entertainment device. The media selection request includes a selected media file. The media application is facilitated by a server system. The method includes detecting at least one script file of a plurality of script files corresponding to the selected media file on the user device and on the server system. The method includes displaying a list of local script files detected from the user device and a list of public script files detected from the server system. The method includes receiving a user selection of a script file from one of: the list of local script files; and the list of public script files. The selected script file includes a corresponding pattern created for the selected media file. The method includes playing the selected media file associated with the selected script file. The method includes providing the document to the third-party application. The document is encrypted using a public key of an asymmetric key pair of the third-party application. The method further includes sending one or more intensity instruction signals transformed from the corresponding pattern in the selected script file to the adult entertainment device. The receipt of the one or more intensity signals causes the adult entertainment device to perform customization of one or more adjustable parameters of the adult entertainment device to be in synchronization with the played media file associated with the selected script file.

BRIEF DESCRIPTION OF THE FIGURES

For a more complete understanding of example embodiments of the present technology, reference is now made to the following descriptions taken in connection with the accompanying drawings in which.

Figure 1:
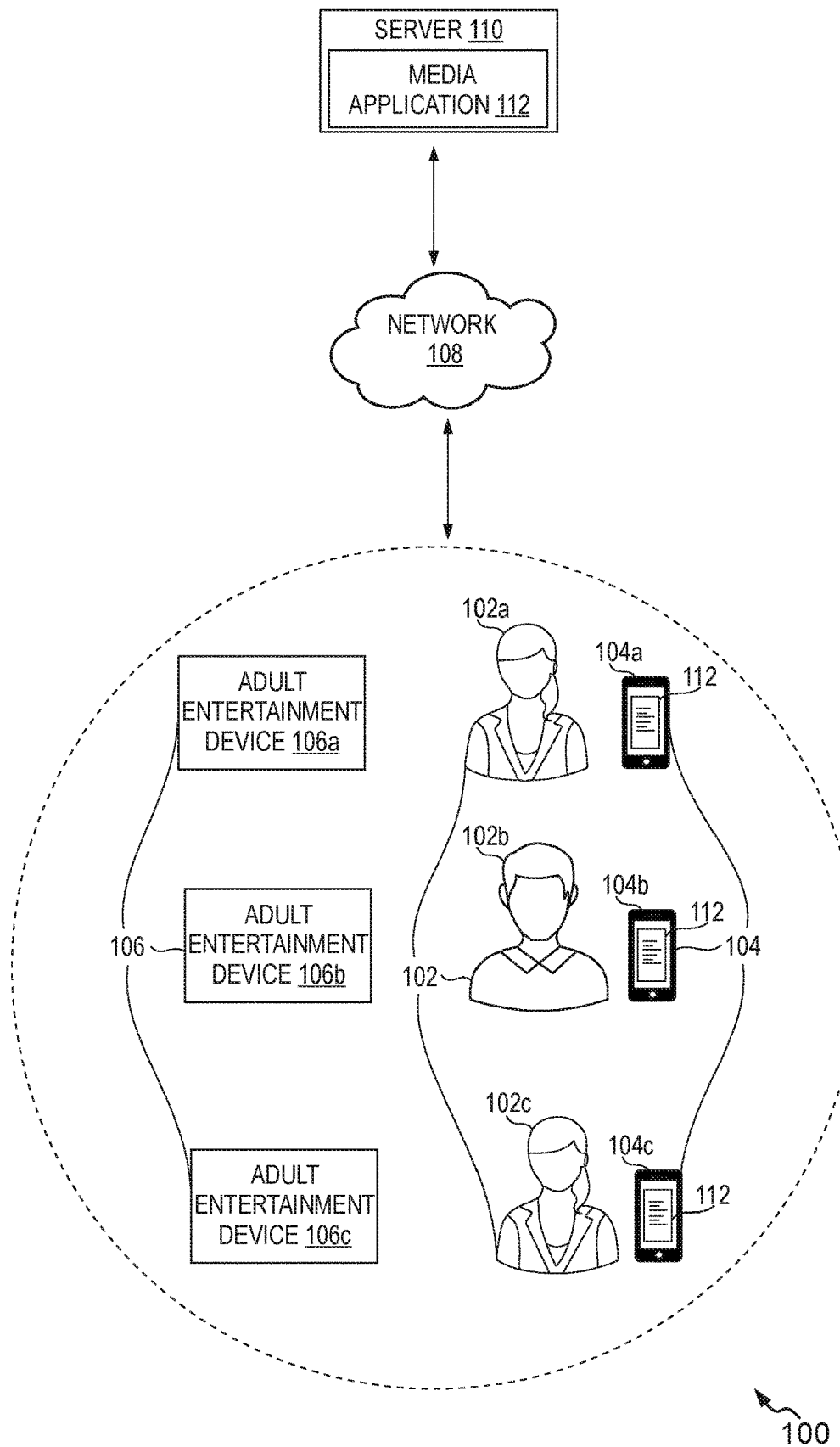
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for creating patterns for an adult entertainment device.

A media application/application system is provided by a server system for facilitating creation of patterns for the media file while playing the media file. A user may use the media application for uploading a media file for which the user wants to create a pattern. The media application/application system is installed on the user device communicably coupled to an adult entertainment device. Creation of a pattern for the media file causes customization of one or more adjustable parameters of the adult entertainment device to be in synchronization with the pattern(s) created for the media file. The term "application system" is hereinafter interchangeably used as "media application" without deviating from the scope of the disclosure, and it is noted that the application system may be present on the server system or on the user device or on any other electronic device communicably coupled to the user device.

For facilitating pattern creation, the media application may play the media file uploaded/selected by the user based on a media play request received from the user device for playing the media file. The media application may then provide a plurality of pattern creation options on a UI of the media application while playing the media file. The user may use a pattern creation option of the plurality of pattern creation options that are provided on the UI for creating the pattern for the media file being played. Once the pattern is created by the user for the media file, the user may provide a saving input for saving the pattern either as a public pattern or a private pattern. The pattern is then stored in a corresponding script file that is stored either on the server system associated with the media application or on the user device based on saving input provided by the user for saving the pattern. In case the user wants to save the pattern as the public pattern, the script file containing the pattern is saved in the server system so that the other users of the media application can use the created pattern. In case the user wants to save the pattern as the private pattern, the script file containing pattern is saved in the user device and is available for use only by the user. The created pattern at least includes a frequency pattern and an amplitude pattern.

Further, the user is enabled to experience a real-time feeling of engagement for the created pattern while playing the media file using the media application running on the user device connected to the adult entertainment device associated with the user.

For viewing a specific pattern of a plurality of patterns of the media file, the user may select the media file and a plurality of script files associated with the corresponding plurality of patterns that are created for the media file, are displayed on the UI of the media application. The user may now select a script file that the user wants to play, and the media file associated with the selected script file is then played on the user device.

The media application may then send one or more intensity instruction signals transformed from a corresponding pattern present in the selected script file to the adult entertainment device connected to the user device. The adult entertainment device, upon receiving the intensity instruction signals, causes the customization of the adjustable parameters of the adult entertainment device to be in synchronization with the media file being played. The synchronization of the adjustable parameters with the played media file ensures that movements of a character in the played media file are synched with operation of the adult entertainment device, thereby ensuring a real-time feeling of engagement to the user using the adult entertainment device.

Various example embodiments of present disclosure are described hereinafter with reference to FIGS. 1 to 12.

FIG. 1 is an illustration of an environment 100 related to at least some example embodiments of present disclosure. The environment 100 includes, but is not limited to, a wireless communication network (e.g., a network 108) that connects entities such as users 102*a*, 102*b* and 102*c*, and a server 110. The users 102*a*, 102*b* and 102*c* are depicted to be associated with electronic devices 104*a*, 104*b* and 104*c* (hereinafter referred to as 'user device 104*a*, user device 104*b* and user device 104*c*', respectively) and adult entertainment devices 106*a*, 106*b* and 106*c*, respectively. It should be noted that each user is shown to be associated with a single adult entertainment device for the sake of simplicity, but each user can be associated with multiple adult entertainment devices. It should be noted that the users 102*a* to 102*c* are collectively referred as a user 102, the user devices 104*a* to 104*c* are collectively referred as a user device 104 and the adult entertainment devices 106*a* to 106*c* are collectively referred as an adult entertainment device 106.

In an embodiment, the user device 104 is equipped with a media application 112 that facilitates creation of patterns for a media file. The user device 104 may be any communication devices having hardware components for enabling User Interfaces (UIs) of the media application 112 to be presented on the user device 104. The user device 104 may be capable of being connected to a wireless communication network (such as the network 108). Examples of the user device 104 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

The server 110 may provide the media application 112, in response to a request received from the user device 104 via the network 108. The media application 112 is referred as an application system interchangeably throughout the disclosure without deviating from the scope of the invention. Further, it is noted that the application system may be present on the server 110 or on the user device 104 or on any other electronic device communicably coupled to the user device 104. Examples of the network 108 include stand alone or a combination of a local area network (LAN), a wide area network (WAN), wireless, wired, any currently existing or to be developed network that can be used for communication. More specifically, an example of the network 108 can be the Internet which may be a combination of a plurality of networks. In an embodiment, the media application 112 may be factory-installed on the user device 104 and the user 102 may not need to specifically request the media application 112 from the server 110. In another embodiment, the user device 104 may access an instance of the media application 112 from the server 110 for installing on the user device 104 by accessing a media application domain. In yet another embodiment, the media application 112 may be accessed by the user device 104 through web via the network 108. More specifically, the media application 112 may be accessed by the user device 104 through the web via the Internet.

In an embodiment, the media application 112 is configured to facilitate uploading/selecting and playing of a media file. The media application 112 is also configured to facilitate creation of a plurality of patterns for the selected media file while playing the media file by a plurality of users, such as the users 102*a* to 102*c* of the media application 112. Examples of the media file include, but are not limited to, a two-dimensional (2D) video file, a three-dimensional (3D) video file, a virtual reality (VR) based video file, and an audio file. The media application 112 is then configured to store each pattern of the plurality of patterns that are created for the media file in a corresponding script file. Further, the media application 112 is configured to facilitate saving of the created patterns as public patterns or private patterns. In case of public patterns, a plurality of script files associated with the plurality of patterns are stored on a server system, such as the server 110 as a list of public script files. In case of private patterns, the plurality of script files associated with the plurality of patterns are stored on the corresponding user devices, such as the user devices 104*a* to 104*c* as a list of local script files. Additionally, the media application 112 is configured to facilitate sharing, downloading and editing of each pattern that is created for the media file by the users 102*a* to 102*c* of the media application 112.

In at least one example embodiment, the media application 112 is configured to electronically connect the user device 104 with the adult entertainment device 106 using any wired or wireless technologies. In an embodiment, the media application 112 electronically connects the user device 104 with the adult entertainment device 106 using Bluetooth technology. In some embodiments, the user device 104 directly gets connected with the adult entertainment device 106 using the Bluetooth technology. The user device 104 and the adult entertainment device 106 are Bluetooth-enabled devices for supporting connection establishment using the Bluetooth technology.

Further, the media application 112 is also configured to detect and display the plurality of script files available corresponding to the plurality of patterns that are created and are available for each media file of the plurality of media files available in the user device 104. The media application 112 is then configured to facilitate selection of a script file from the plurality of script files by the user 102. Further, the media application 112 is configured to play the media file associated with the selected script file and create one or more intensity instruction signals by transforming the pattern i.e.

a frequency pattern and an amplitude pattern present in the selected script file to the one or more intensity instruction signals.

Additionally, the media application 112 is configured to send the one or more intensity instruction signals to the adult entertainment device 106 connected with the user device 104 along with the playing of the media file. In one embodiment, the one or more intensity instruction signals include at least one frequency intensity instruction signal that is created from the frequency pattern included in the selected script, and at least one amplitude intensity instruction signal that is created from the amplitude pattern included in the selected script. The at least one frequency intensity instruction signal is responsible for causing customization of at least one of a vibration frequency, a rotation frequency, and a contraction frequency of the adult entertainment device 106, and the at least one amplitude intensity instruction signal is responsible for causing customization of at least one of a vibration amplitude, and contraction amplitude of the adult entertainment device 106.

In an embodiment, the adult entertainment device 106 can be a female entertainment device or a male entertainment device. The female entertainment device is configured to stimulate pleasure hotspots in a body of a female by generating rotating and vibrating sensations at the pleasure hotspots. The male entertainment device is configured to generate air pressure and vibrations around an intromittent organ of a male that creates a suction feeling in the intromittent organ that further helps in achieving masturbation.

Further, based on the receipt of the intensity instruction signals from the media application 112, the adult entertainment device 106 is configured to perform customization of one or more adjustable parameters, such as the vibration amplitude, the vibration frequency, the rotation frequency, the contraction amplitude and the contraction frequency of the adult entertainment device 106 to be in synchronization with the selected media file associated with the selected script file, thereby enhancing sexual experience of the user 102 using the adult entertainment device 106. The working of the adult entertainment device 106 is further explained in detail with reference to FIG. 6.

The user 102 may access the media application 112 for uploading and playing a media file. The user 102 may also access the media application 112 for creating a pattern for the media file being played. The pattern can be a public pattern or a private pattern. In an embodiment, the user 102 may be asked to first register with the media application 112 for creating the public pattern. The user 102 can create a private pattern without performing registration with the media application 112. The user 102 may further access the media application 112 for viewing and playing patterns that are available for a selected media file. Additionally, the user 102 may access the media application 112 for editing one or more patterns that are available for the media file.

In an embodiment, the user 102 may access the media application 112 for connecting the adult entertainment device 106 with the user device 104 which further synchronizes the functioning of the adult entertainment device 106 according to the media file played on the user device 104.

In an example scenario, as shown in FIG. 1, the user 102 may want to create a pattern for a media file XYZ.MPEG (not shown). The user 102 may use the media application 112 installed on the user device 104 for uploading the media file XYZ.MPEG. The media file XYZ.MPEG can be uploaded from a local drive on the user device 104 or the user 102 may upload the media file XYZ.MPEG to the media application 112 from a cloud drive. Once the media file XYZ.MPEG is uploaded by the user 102, the media application 112 may start playing the media file XYZ.MPEG based on a request received from the user device 104 for playing the media file XYZ.MPEG. The media application 112 may then provide a plurality of pattern creation options on a user interface (UI) of the media application 112 for facilitating creation of at least one pattern for the media file XYZ.MPEG while playing the media file XYZ.MPEG. In an embodiment, the plurality of pattern creation options include, but are not limited to, a drag and drop option, a touch panel option, a virtual keys option and a keyboard keys option. The user 102 may then create a pattern for the media file XYZ.MPEG as per the requirement of the user 102 using any one of a pattern creation option of the plurality of pattern creation options. In one embodiment, the user 102 can also provide a name for the created pattern and the created pattern is saved under the provided name.

In an embodiment, the media application 112 provides various modes e.g., a default setting mode and a personalized setting mode for creating various types of patterns for the media files. In the default setting mode, the selected media file XYZ.MPEG is played once by the media application 112 to enable the user 102 to create only one of the frequency pattern and the amplitude pattern, as both the frequency pattern and the amplitude pattern overlap with each other in the default setting mode. So, when the user 102 creates one of the amplitude or the frequency pattern, the other pattern is automatically created by the media application 112. In the personalized setting mode, the selected media file XYZ.MPEG is played twice by the media application 112 to enable the user 102 to create both the frequency pattern and the amplitude pattern, as both the frequency pattern and the amplitude pattern are different in the personalized setting mode. So, when the user 102 plays the media file XYZ.MPEG for the first time, either frequency pattern or the amplitude pattern is created and when the media file XYZ.MPEG is played for the second time, a remaining pattern from the frequency pattern or the amplitude pattern is created.

In a non-limiting example, once the pattern is created by the user 102 for the media file XYZ.MPEG, the media application 112 may provide a saving option on the UI for saving the pattern as the public pattern or the private pattern. The user 102 can choose to either save the created pattern as the public pattern or the private pattern. In case, the user 102 chooses to save the pattern as the public pattern, the pattern is saved in a database associated with the server 110, otherwise the pattern is saved on a local drive of the user device 104. The created pattern is then stored in a corresponding script file that is further stored either on the server 110 or on the local drive of the user device 104 based on the saving option selected by the user 102.

Further, the user 102 may use the UI of the media application 112 to send a connection request to communicably connect the adult entertainment device 106 with the user device 104. The connection request may include a device identification (ID) of the adult entertainment device 106. The media application 112, upon receiving the connection request, may look for devices available near the user device 104 and may electronically connect the adult entertainment device 106 with the user device 104 based on the device ID. In a non-limiting example, the adult entertainment device 106 is connected with the user device 104 using Bluetooth technology.

Once the adult entertainment device 106 is connected with the user device 104, the user 102 may select the same media file XYZ.MPEG on the UI of the media application 112. Upon selection of the media file XYZ.MPEG, the media application 112 may display the plurality of script files associated with the selected media file XYZ.MPEG on the UI. The media application 112 may then facilitate selection of a script file from the plurality of script files by the user 102. This results in sending of a media play request to the media application 112. The media application 112 plays the media file XYZ.MPEG associated with the selected script file and sends one or more intensity instruction signals created corresponding to the selected script file to the adult entertainment device 106 connected to the user device 104.

Thereafter, the adult entertainment device 106 customizes the adjustable parameters based on the intensity instruction signals such that the adjustable parameters are in synchronization with the media file being played, thereby providing sexual experience as per the needs of the user 102.

In one embodiment, the media application 112 is an application resting at the server 110. In an embodiment, the server 110 is configured to host and manage the media application 112 and communicate with devices, such as the user device 104 and the adult entertainment device 106 using the network 108.

Figure 12:
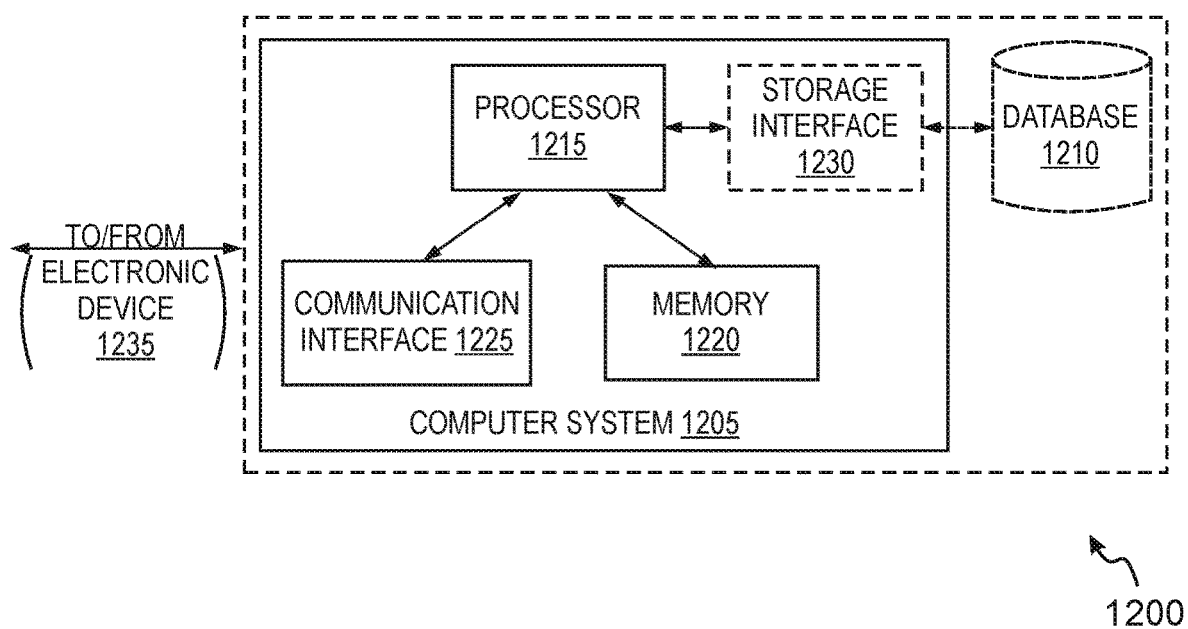
FIG. 12 is a block diagram of a server system, in accordance with an example embodiment of the present disclosure.

It is noted that the instructions (or the executable code) configuring the media application 112/the application system are stored in a memory of the server 110 and the instructions are executed by a processor (for example, a single-core or a multi-core processor) included within the server 110, as is exemplarily shown with reference to FIG. 12. Accordingly, even though the various functionalities for facilitating pattern creation for a media file are explained with reference to or being performed by the media application 112 installed on the user device 104, it is understood that the processor in conjunction with the code in the memory is configured to execute the various tasks as enabled by the instructions of the media application 112 facilitated by the server 110.

Figure 2:
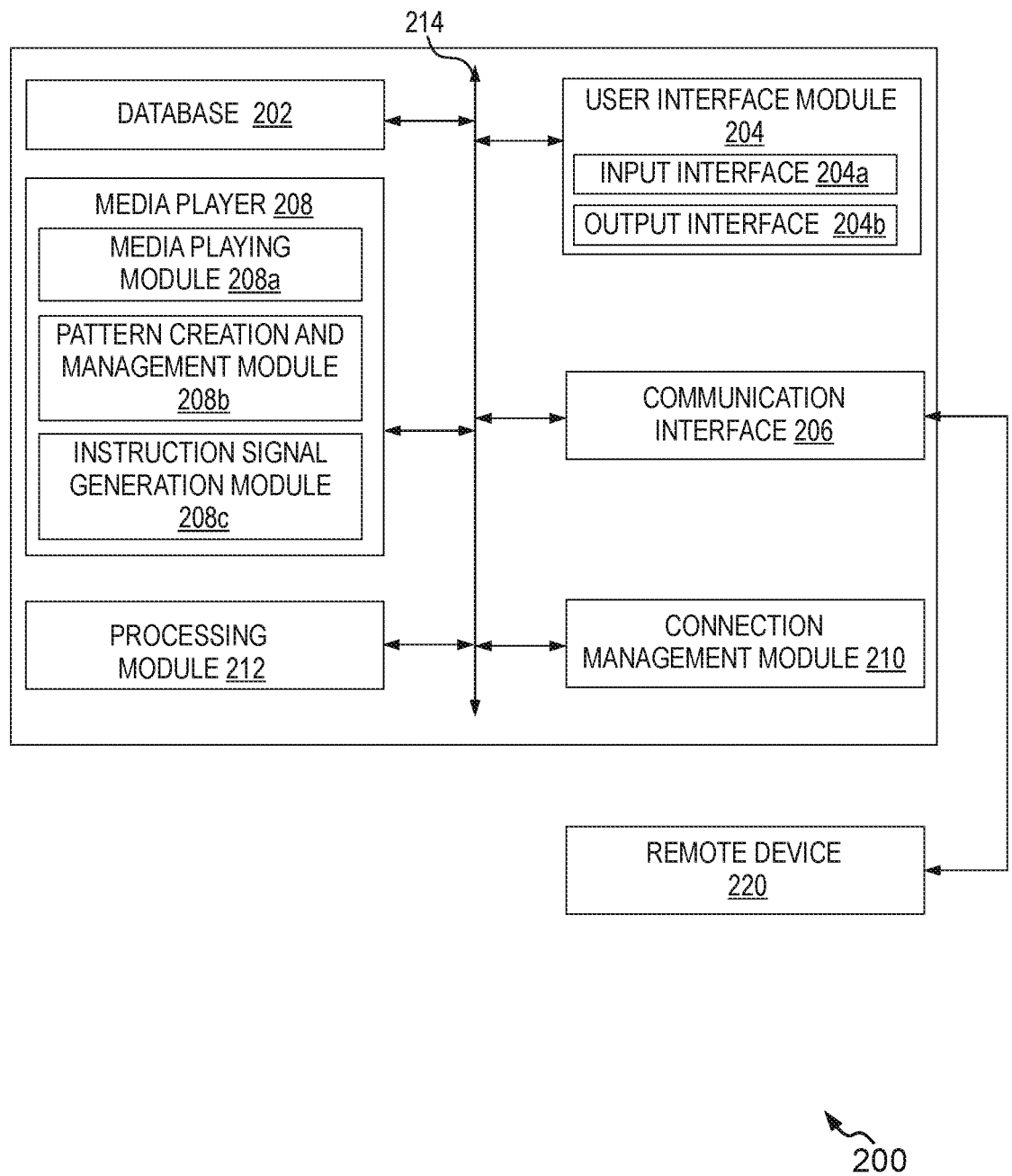
FIG. 2 is a block diagram of an application system for creating patterns for an adult entertainment device, in accordance with an example embodiment of the present disclosure.

FIG. 2 is a block diagram of a system 200 for creating patterns for an adult entertainment device (e.g., the adult entertainment device 106), in accordance with an example embodiment. The system 200 may be a server, such as the server 110 providing the media application 112/the application system or electronic devices, such as, the user devices 104a to 104c in which the media application 112/the application system is installed. The system 200 is configured to facilitate creation of one or more patterns for the media file. The created patterns may further be used to control adjustable parameters of the adult entertainment device connected with a user device (e.g., the user device 104). In an embodiment, the system 200 includes a database 202, a user interface (UI) module 204, a communication interface 206, a media player 208, a connection management module 210, a processing module 212 and a centralized circuit system 214.

The database 202 is configured to store a plurality of patterns created for each media file of a plurality of media files by one or more users (e.g., the users 102a to 102c). The database 202 is also configured to store a plurality of script files created corresponding to the plurality of patterns of each media file of the plurality of media files. In one embodiment, the database 202 stores the plurality of script files as a list of local script files and a list of public script files. Further, the database 202 is configured to store user details associated with each user of the plurality of users. The user details include, but are not limited to, email-id of the user and name of the user.

The UI module 204 is in communication with the database 202. The UI module 204 is configured to present one or more UIs for performing various features of the present disclosure including facilitating creation of one or more patterns for the media file. The UI module 204 includes an input interface 204a and an output interface 204b. The input interface 204a is configured to receive media files that the users wish to upload. The input interface 204a is also configured to receive patterns created for each media file. The input interface 204a is also configured to receive user details associated with each user. Further, the input interface 204a is also configured to receive media play requests for playing the media files, media selection requests for selecting the media files, and connection requests for connecting the adult entertainment device with the user devices associated with one or more users (e.g., the users 102a to 102c) of the system 200. Additionally, the input interface 204a is configured to receive user details associated with users of the system 200. Examples of the input interface 204a may include, but are not limited to, a keyboard, a mouse, a joystick, a keypad, a touch screen, soft keys, a floppy disk, a pen drive, a hard drive and the like. In an embodiment, the output interface 204b is configured to display a list of local script files and a list of public script files associated with a selected media file. The output interface 204b is also configured to display a plurality of pattern creation options for facilitating pattern creation. Further, the output interface 204b is configured to display a list of adult entertainment devices that are available for connection with a user device. Examples of the output interface 204b may include, but are not limited to, a display such as a light emitting diode (LED) display, a thin-film transistor (TFT) display, a liquid crystal display, an active-matrix organic light-emitting diode (AMOLED) display, and the like.

The communication interface 206 is configured to enable communication with a remote device 220, such as the user device 104 and/or the adult entertainment device 106 by exchanging requests, responses, instruction signals, and other messages.

The media player 208 is in communication with the database 202, the UI module 204 and the communication interface 206. The media player 208 is configured to play locally stored 2D or 3D videos/audios (i.e., media files). The media player 208 is also configured to facilitate creation of patterns for the played videos/audios. The media player 208 includes a media playing module 208a, a pattern creation and management module 208b, and an instruction signal generation module 208c (hereinafter referred to as 'modules 208a to 208c).

The media playing module 208a is configured to play the media file based on a media play request received from the remote device 220. The media playing module 208a is configured to play a selected media file associated with a selected script file. In an embodiment, the selected media file is played by the media playing module 208a for facilitating creation of a pattern for the media file being played. In another embodiment, the selected media file is played by the media playing module 208a for facilitating viewing of the selected media file in the remote device 220 that further sends one or more intensity instruction signals to the adult entertainment device connected with the remote device 220.

The pattern creation and management module 208b is configured to create the pattern for the media file being played based on pattern inputs provided by the user using a pattern creation option of the plurality of pattern creation options. The pattern creation and management module 208b is also configured to store the created pattern in a script file created for the pattern. The script file may be further stored in the database 202.

The instruction signal generation module 208c is in communication with the pattern creation and management module 208b. The instruction signal generation module 208c is configured to create intensity instruction signals by transforming the pattern created for the media file by the pattern creation and management module 208b. The intensity instruction signals are generated when the adult entertainment device is connected with the remote device 220 and the user has selected and played a media file. In an example embodiment, the created pattern includes a frequency pattern and an amplitude pattern. The instruction signal generation module 208c may transform the frequency pattern of the created pattern into a corresponding frequency intensity instruction signal and the amplitude pattern into a corresponding amplitude intensity instruction signal. The frequency intensity instruction signal and the amplitude intensity instruction signal together make the intensity instruction signals. The intensity instruction signals are configured to cause customization of the adjustable parameters, such as the vibration amplitude, the vibration frequency, the rotation frequency, the contraction amplitude and the contraction frequency of the adult entertainment device to be in synchronization with the media file being played.

The connection management module 210 is configured to connect the system 200 with the adult entertainment device. In an embodiment, the connection management module 210 may use one of Bluetooth, Infrared or radio wave technology for connecting the system 200 with the adult entertainment device. The connection management module 210 is also configured to manage connection between the adult entertainment device and the system 200 while the user is using the adult entertainment device. Further, the connection management module 210 is configured to maintain details about the adult entertainment devices that are being connected to the system 200.

The processing module 212 is in communication with the database 202, the UI module 204, the communication interface 206, the connection management module 210 and the modules 208a to 208c of the media player 208. The processing module 212 is configured to send operating instructions to the database 202, the UI module 204, the communication interface 206, the connection management module 210 and the modules 208a to 208c of the media player 208 for facilitating creation of patterns for the media file and for operating the adult entertainment device based on the patterns created for the media file. In an embodiment, the patterns may sync vibrations/movements generated by the adult entertainment device with movement of a character displayed in the played video, thereby enhancing pleasure of the user using the adult entertainment device.

The database 202, the UI module 204, the communication interface 206, the connection management module 210, the modules 208a to 208c of the media player 208 and the processing module 212 may be configured to communicate with each other via or through the centralized circuit system 214. The centralized circuit system 214 may be various devices configured to, among other things, provide or enable communication among the modules (202-212) of the system 200. In certain embodiments, the centralized circuit system 214 may be a central printed circuit board (PCB) such as a motherboard, a main board, a system board, or a logic board. The centralized circuit system 214 may also, or alternatively, include other printed circuit assemblies (PCAs) or communication channel media. In some embodiments, the centralized circuit system 214 may include appropriate storage interfaces to facilitate communication among the modules (202-212). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3:
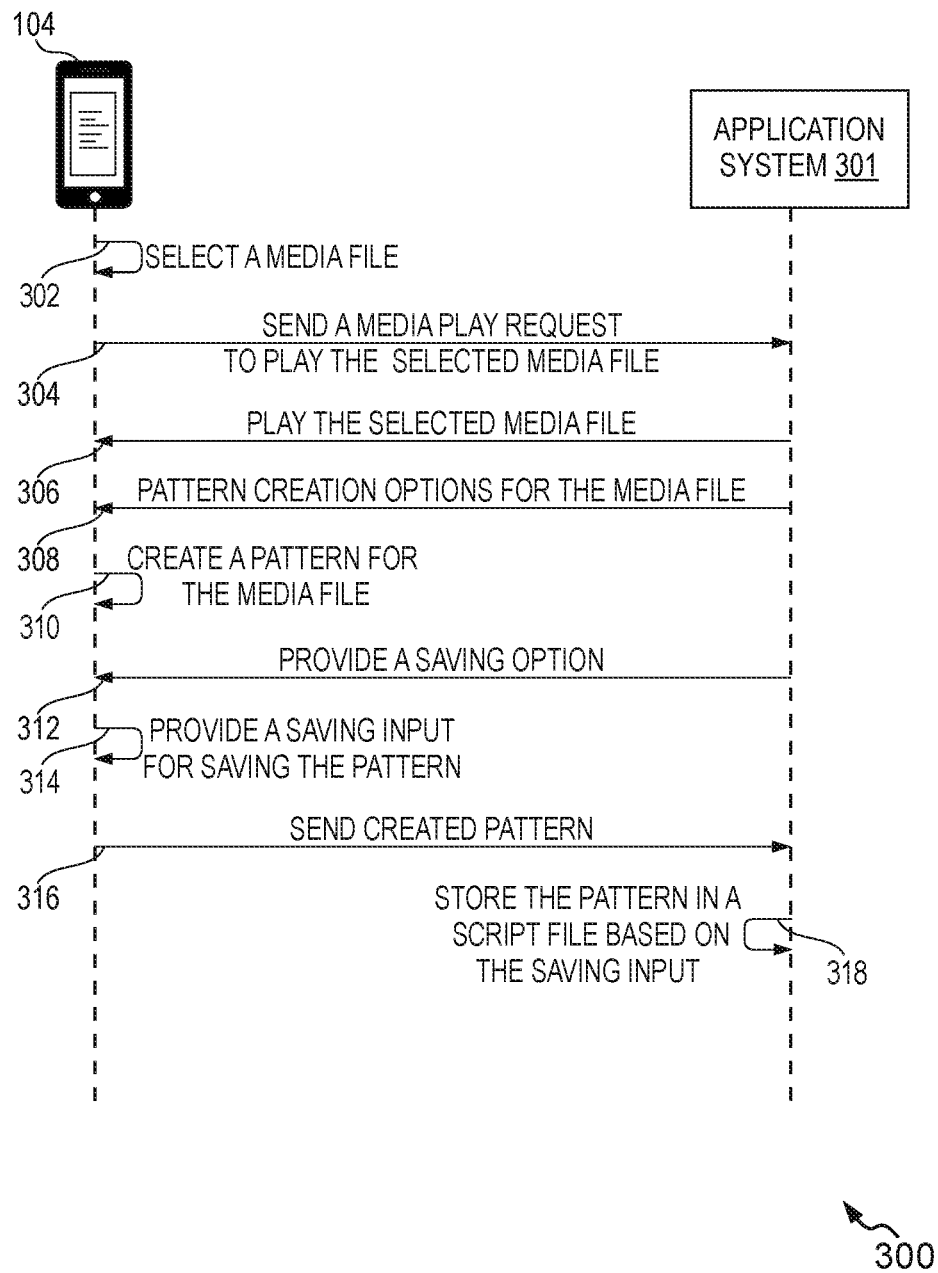
FIG. 3 is a sequence flow diagram for facilitating creation of a pattern for a media file, in accordance with an example embodiment of the present disclosure.

FIG. 3 is a sequence flow diagram 300 for facilitating creation of a pattern for a media file, in accordance with an example embodiment. The steps of the sequence flow diagram 300 are performed when the user 102 wishes to create a pattern for a video (an example of a media file) using the media application 112 running on the user device 104. The steps of the sequence flow diagram 300 may not to be necessarily executed in the same order as they are presented. Further, one or more steps may be grouped together and performed in form of a single step, or one step may have several sub-steps that may be performed in parallel or in sequential manner. The media application 112 is referred as an application system 301. It is to be noted that the application system 301 may be present on the server 110 or on the user device 104 or on any other electronic device communicably coupled to the user device 104.

At 302, a user (e.g., the user 102), using a UI provided by the application system 301 on a user device (e.g., the user device 104), may select a media file for which the user 102 wants to create a pattern from a plurality of media files that are available on a local drive of the user device 104.

At 304, a media play request to play the selected media file is sent to the application system 301 from the user device 104. The media play request includes the selected media file.

At 306, the application system 301, upon receiving the media play request, starts playing the selected media file on the user device 104. At 308, the application system 301 provides a plurality of pattern creation options on the UI provided by the application system 301 for facilitating creation of a pattern for the selected media file while playing the selected media file.

At 310, the user 102 creates the pattern for the selected media file using at least one pattern creation option of the plurality of pattern creation options that are provided by the application system 301. The pattern is created in one of the two modes i.e. the default setting mode and the personalized setting mode that are offered by the application system 301 for creating patterns for the media files. The modes are explained in detail with reference to FIG. 5A to 5C.

At 312, the application system 301 provides a saving option on the UI for saving the created pattern as a public pattern or a private pattern. The public pattern is stored on a server system (e.g., the server 110, also an example of the system 200) so that the pattern is available for use by other users of the application system 301. The private pattern is stored on the user device 104 (another example of the system 200) of the user 102. At 314, the user 102 provides a saving input for saving the pattern either as the public pattern or the private pattern. At 316, the media application 112 sends the saving input to the application system 301.

At 318, the application system 301 stores the pattern in a corresponding script file and saves the pattern as the public pattern or the private pattern based on the saving input provided by the user 102. In case, the user 102 wants to save the pattern as the public pattern, the application system 301 may reside in the server 110 and the script file created for the pattern may be stored in a database associated with the server 110. In case the user 102 wants to save the pattern as the private pattern, the application system 301 may reside in the user device 104 and the script file created for the pattern may be stored in a local drive of the user device 104.

Figure 4:
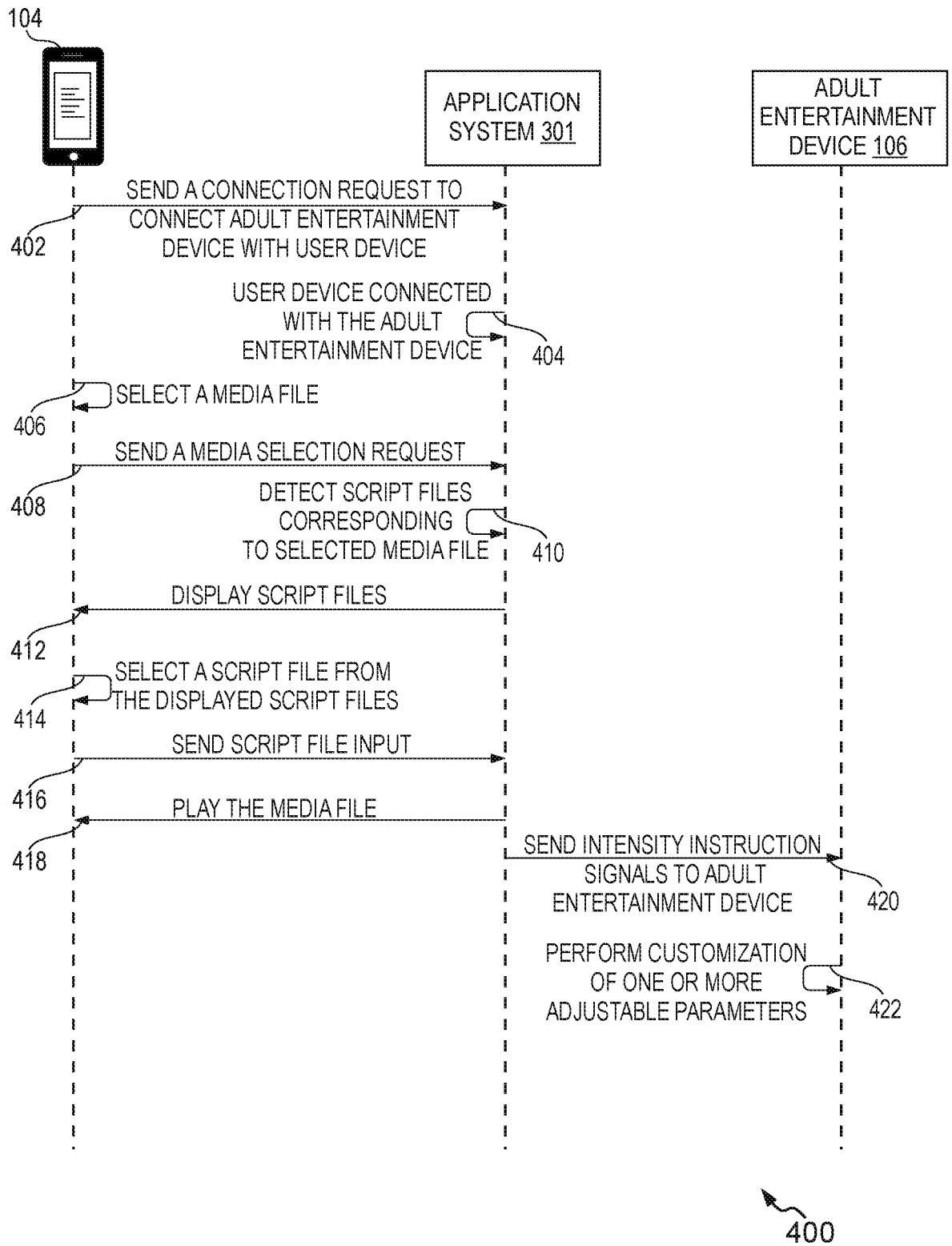
FIG. 4 is a sequence flow diagram for playing the pattern of the media file while using the adult entertainment device, in accordance with an example embodiment of the present disclosure.

FIG. 4 is a sequence flow diagram 400 for playing a pattern of the media file while using the adult entertainment device (e.g., the adult entertainment device 106) connected with a user device (e.g., the user device 104), in accordance with an example embodiment. The steps of the sequence flow diagram 400 are performed when a user (e.g., the user 102) wants to experience a real-time feeling of engagement while using the adult entertainment device 106. The steps of the sequence flow diagram 400 may not to be necessarily executed in the same order as they are presented. Further, one or more steps may be grouped together and performed in form of a single step, or one step may have several sub-steps that may be performed in parallel or in sequential manner.

The media application 112 is referred as an application system 301. It is to be noted that the application system 301 may be present on the server 110 or on the user device 104 or on any other electronic device communicably coupled to the user device 104.

At 402, a user, using a UI provided by the application system 301 on the user device 104, sends a connection request to the application system 301 to communicably connect the user device 104 with the adult entertainment device 106 associated with the user 102. The connection request includes a device ID associated with the adult entertainment device 106.

At 404, upon receiving the connection request, the user device connects with the adult entertainment device 106 from available one or more adult entertainment devices based on the device ID of the adult entertainment device 106.

At 406, when the adult entertainment device 106 gets connected with the user device 104, the user 102 selects a media file that the user 102 wants to play using the UI provided by the application system 301 in the user device 104. In an embodiment, the media file is selected from a local drive in the user device 104. At 408, the selection of the media file generates a media selection request that is sent to the application system 301. The media selection request includes the media file selected by the user 102.

At 410, the application system 301 detects script files that are available corresponding to the selected media file on the user device 104 and on the server 110. The detected script files can be a combination of local script files that are created by the user 102 and are available on the user device 104 as well as the public script files that are stored in the server 110 by a plurality of users of the application system 301. At 412, the application system 301 displays the script files on the UI presented on the user device 104.

At 414, the user 102 selects a script file from the displayed script files. The selected script file includes a corresponding pattern that the user wants to play for the selected media file. At 416, the selection of the script file generates a script file input that is sent to the application system 301. The script file input includes the selected script file.

At 418, upon receiving selection input, the application system 301 starts playing the media file associated with the selected script file on the user device 104. At 420, the system 200 sends one or more intensity instructions signals transformed from the pattern in the selected script file to the adult entertainment device 106. A frequency pattern and an amplitude pattern of the pattern in the selected script file are transformed into the intensity instructions signals i.e. frequency intensity instruction signal and amplitude intensity instruction signal. The frequency intensity instruction signal and amplitude intensity instruction signal are then sent to the adult entertainment device 106. In an embodiment, the step 422 is performed simultaneously with the step 420.

At 422, the adult entertainment device 106, upon receiving the intensity instructions signals, performs customization of one or more adjustable parameters to be in synchronization with the selected media file associated with the selected script file. The at least one frequency intensity instruction signal received from the application system 301 customizes at least one of the vibration frequency, the rotation frequency, and the contraction frequency of the adult entertainment device 106 based on the frequency pattern of the selected pattern for the played audio file. Similarly, the at least one amplitude intensity instruction signal received from the application system 301 customizes at least one of the vibration amplitude and contraction amplitude of the adult entertainment device 106 based on the amplitude pattern of the selected pattern for the played audio file. The synchronization of the adjustable parameters with the played media file ensures that movements of a character in the played media file are synched with operation of the adult entertainment device 106, thereby providing a real-time feeling of engagement to the user 102 using the adult entertainment device 106.

Figure 5A:
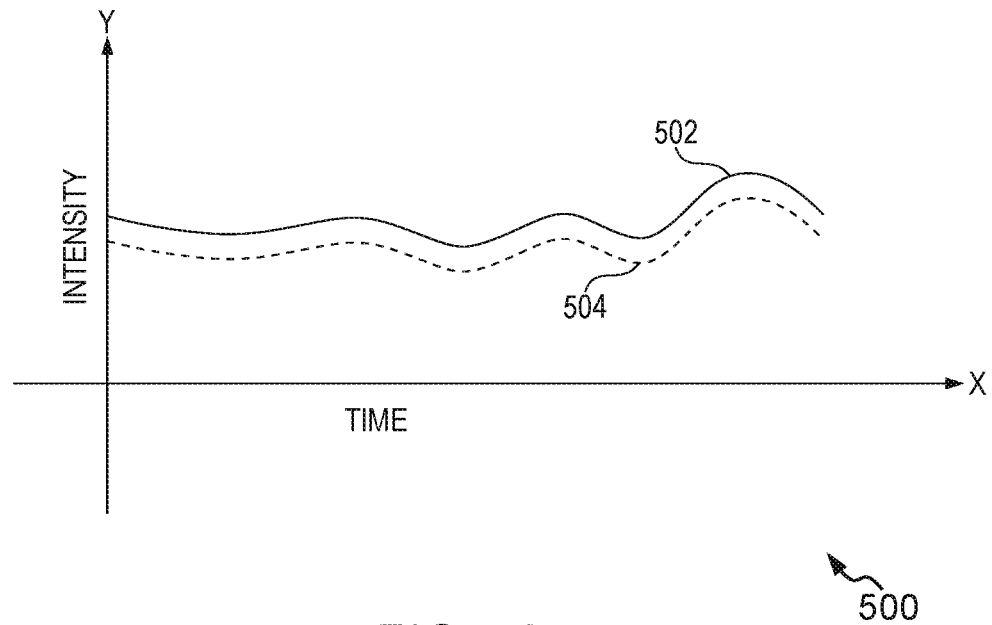
FIG. 5A is a graphical representation of the pattern created for the media file using a media application or an application system, in accordance with another example embodiment of the present disclosure.

FIG. 5A is a graphical representation 500 of a pattern created for a media file using the media application 112 or the application system 301, in accordance with an example embodiment. The pattern created for the media file (e.g., a 2D video) is a combination of a frequency pattern and an amplitude pattern. The frequency pattern in the pattern is represented as a frequency curve 502 and the amplitude pattern in the pattern is represented as an amplitude curve 504. The frequency curve 502 and the amplitude curve 504 in the pattern are further used to create the at least one frequency intensity instruction signal and the at least one amplitude intensity instruction signal, respectively, for causing customization of the adjustable frequency parameters, such as the vibration frequency, the rotation frequency and the contraction frequency, and the amplitude parameters, such as the vibration amplitude and the contraction amplitude of an adult entertainment device (e.g., the adult entertainment device 106) connected with a user device (e.g., the user device 104) while playing the pattern created for the media file using the media application 112 installed on the user device.

Figure 5B:
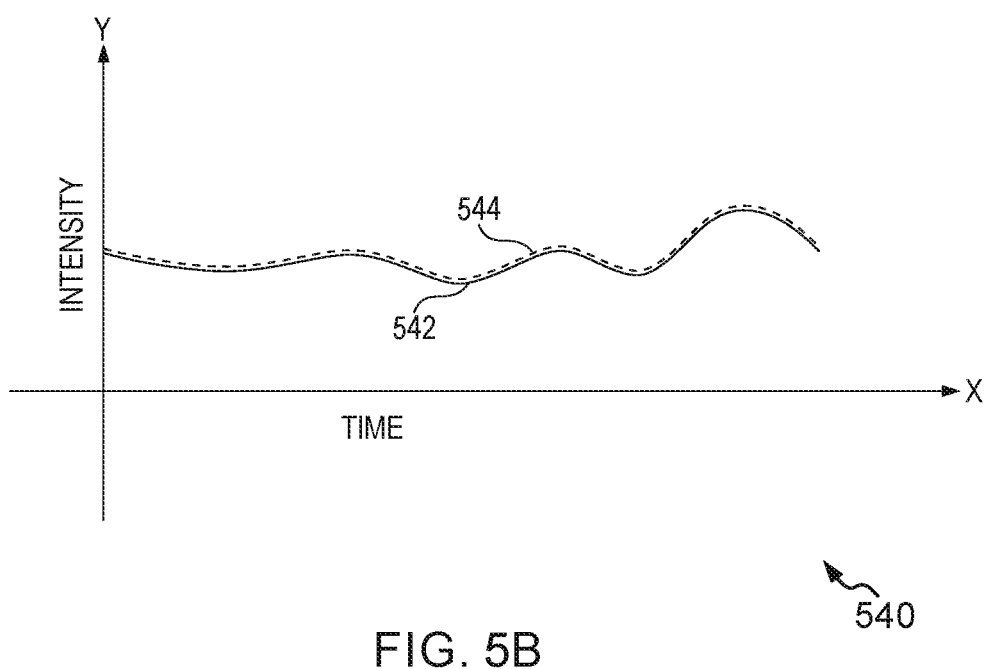
FIG. 5B is a graphical representation of a pattern created for the media file in a default setting mode using the media application or the application system, in accordance with an example embodiment of the present disclosure.

FIG. 5B is a graphical representation 540 of a pattern created for a media file in a default setting mode using the media application 112 or the application system 301, in accordance with an example embodiment.

As explained earlier, in the default setting mode, one of the frequency pattern and the amplitude pattern is created by the user for creating the pattern as the frequency pattern and the amplitude pattern overlap with each other in the default setting mode. So, when the user creates a first pattern, e.g., a frequency pattern, a second pattern i.e. an amplitude pattern is created automatically by the media application 112 and is same as the first pattern.

As shown in FIG. 5B, a frequency curve 542 is created on a graph based on the created frequency pattern and an amplitude curve 544 (represented by dotted lines) is automatically created for defining the amplitude pattern. The amplitude curve 544 is similar to the frequency curve 542 as both the frequency pattern and the amplitude pattern overlap with each other in the default setting mode.

Figure 5C:
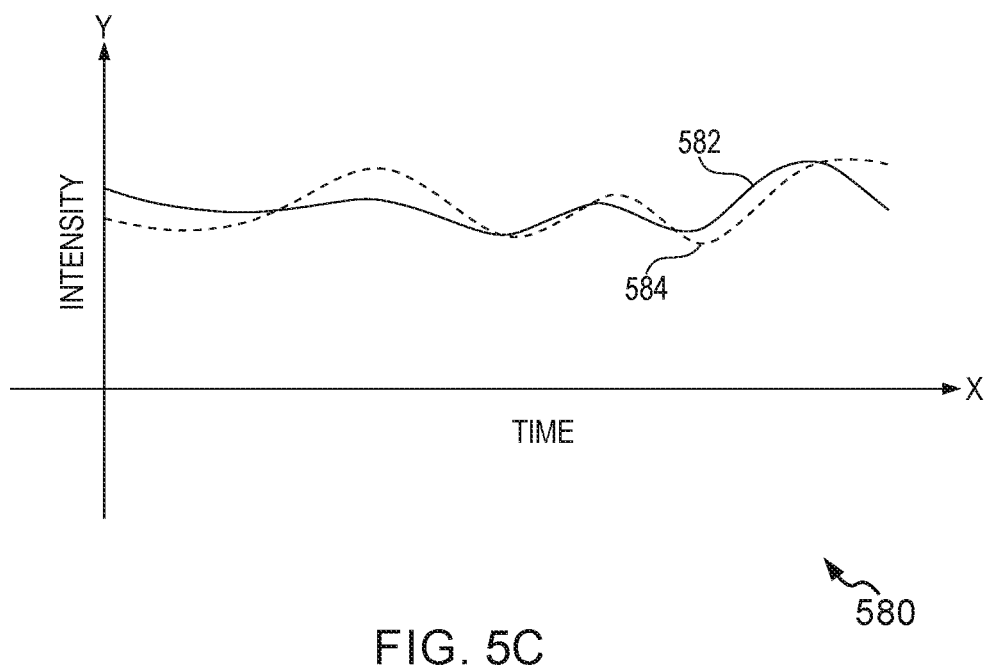
FIG. 5C is a graphical representation of a pattern created for the media file in a personalized setting mode using the media application or the application system, in accordance with an example embodiment of the present disclosure.

FIG. 5C is a graphical representation 580 of a pattern created for a media file in a personalized setting mode by the media application 112 or the application system 301, in accordance with an example embodiment.

As explained earlier, in the personalized setting mode, the media file is played twice by the media application 112 to enable the user 102 to create both the frequency pattern and the amplitude pattern, as both the frequency pattern and the amplitude pattern are different in the personalized setting mode. When the media file is played for the first time, the user creates, e.g., a frequency pattern and a corresponding frequency curve 582 is created as shown based on the created frequency pattern. When the media file is played for the second time, the user creates an amplitude pattern and a corresponding amplitude curve 584 (represented by dotted lines) is created as shown based on the created amplitude pattern.

Figure 6:
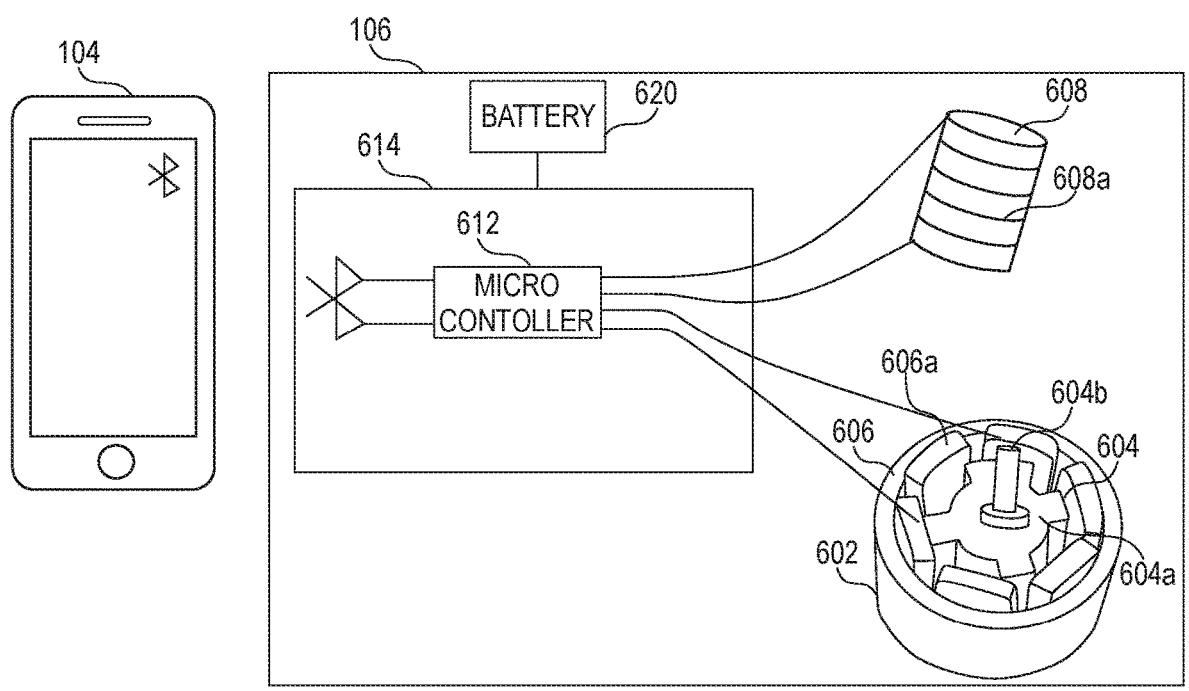
FIG. 6 is a schematic representation depicting various components of the adult entertainment device electronically connected with the user device, in accordance with an example embodiment of the present disclosure.

FIG. 6 is a schematic representation 600 depicting various components of an adult entertainment device (e.g., the adult entertainment device 106) electronically connected with a user device (e.g., the user device 104), in accordance with an example embodiment of the present disclosure. The adult entertainment device 106 can be a male entertainment device or a female entertainment device. The functioning of the adult entertainment device 106 may vary depending of a type of the adult entertainment device i.e. if the adult entertainment device is the female entertainment device, then the working of the adult entertainment device will be different from working of the adult entertainment device which is the male entertainment device as explained with reference to FIG. 1.

In an example embodiment, the adult entertainment device 106 includes a motor 602, an electromagnet 608, a printed circuit board (PCB) 614, a battery 620 and a plurality of wires for electrically connecting different components of the adult entertainment device 106.

In an example embodiment, the motor 602 is an eccentric rotating mass vibration motor (ERM) that uses a small unbalanced mass on a direct current (DC) motor so that when the motor 602 rotates, a force is created that transforms into vibrations (an example of an adjustable parameter of the adult entertainment device 106). The motor 602 includes a rotor 604 and a stator 606. The rotor 604 further includes a permanent magnet 604a and a shaft 604b that are assembled together as shown in the FIG. 6. So, if the permanent magnet 604a rotates, the shaft 604b will automatically rotate with the permanent magnet 604a. The stator 606 includes windings 606a. The windings 606a are electrically connected with the PCB 614 using one or more wires of the plurality of wires. The PCB 614 provides and controls electricity passing through the windings 606a. The windings 606a, upon receiving the electricity from the PCB 614, generate the magnetic field and the generated magnetic field rotates the permanent magnet 604a provided in the rotor 604 that further rotates the shaft 604b assembled with the permanent magnet 604a. The rotation of the shaft 604b causes rotation of an unbalanced mass (not shown) attached to the shaft 604b that further generates vibrations by transforming the force created due to the rotation of the unbalanced mass. Therefore, if electric current that passes through the windings 606a is controlled, vibration frequency of the adult entertainment device 106 can also be controlled. The faster the motor 602 rotates, higher will be the frequency of vibration. The vibration amplitude (another example of an adjustable parameter of the AED) depends on the weight of the unbalanced mass attached to the shaft 604b as the vibration amplitude is directly proportional to the weight of the unbalanced mass.

In order to control the vibration amplitude, the electromagnet 608 is provided in the adult entertainment device 106. In an embodiment, the electromagnet 608 is a magnet that includes a piece of a metal that is surrounded by a coil 608a. Examples of the metal that can be used for creating the electromagnet 608 include, but are not limited to, iron and steel. The coil 608a of the electromagnet 608 is electrically connected with the PCB 614 using the one or more wires of the plurality of wires. The PCB 614 provides and controls electricity passing through the coil 608a. The coil 608a, upon receiving the electricity from the PCB 614, generates the magnetic field as the magnet of the electromagnet 608 becomes magnetic. The magnetic field generated by the magnet causes magnetic attraction to the unbalanced mass, which further changes the vibration amplitude. If the electric current that passes through the coil 608a is controlled, magnetic field intensity of the electromagnet 608 can be controlled that further controls the vibration amplitude.

As explained in the previous figures, the pattern includes a frequency pattern and an amplitude pattern that are transformed into corresponding intensity instruction signals. The intensity instruction signals are further communicated to a microcontroller 612 provided in the PCB 614 of the adult entertainment device 106 using a communication technology. The intensity instruction signals include at least one frequency intensity instruction signal and at least one amplitude intensity instruction signal. Examples of the communication technology include, but are not limited to, Bluetooth technology, Infrared technology and radio wave technology. The microcontroller 612 controls the electricity provided to the windings 606a based on the at least one frequency intensity instruction signal received from the user device 104 thereby controlling at least one frequency based adjustable parameter of the unbalanced mass provided in the adult entertainment device 106 as the electric current passing through the windings 606a controls the functioning of the motor 602. The frequency based adjustable parameter includes the vibration frequency, the rotation frequency, and contraction frequency.

Further, the microcontroller 612 controls the electricity provided to the coil 608a based on the at least one amplitude intensity instruction signal received from the user device 104 thereby controlling at least one amplitude based adjustable parameter of the unbalanced mass provided in the adult entertainment device 106 as the electric current passing through the coil 608a controls the intensity of magnetic field generated by the electromagnet 608. The amplitude based adjustable parameter includes the vibration amplitude and the contraction amplitude.

The battery 620 is configured to provide electrical power to the PCB 614 that further uses the electrical power for operation of the adult entertainment device 106.

Figure 7A:
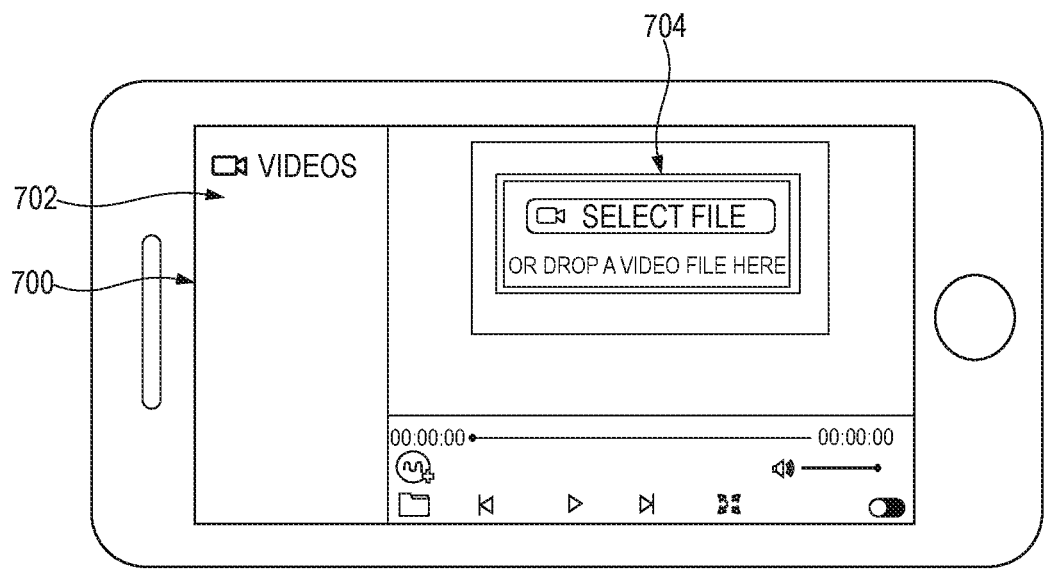
FIGS. 7A to 7C, collectively, represent an example representation of a process to be followed for creating a pattern for a media file with corresponding User Interfaces (UIs), in accordance with an example embodiment of the present disclosure.
Figure 7B:
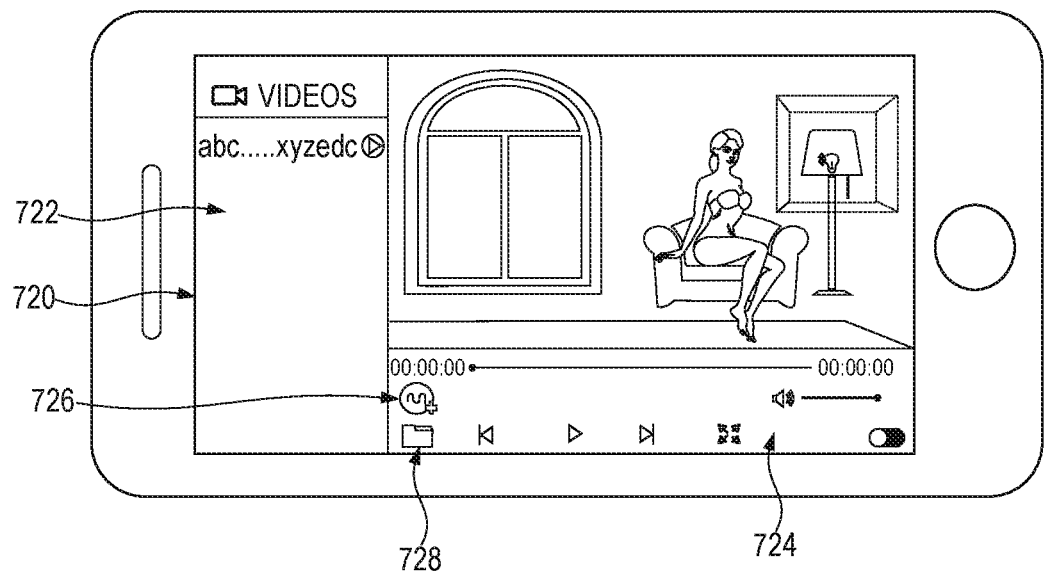
Figure 7C:
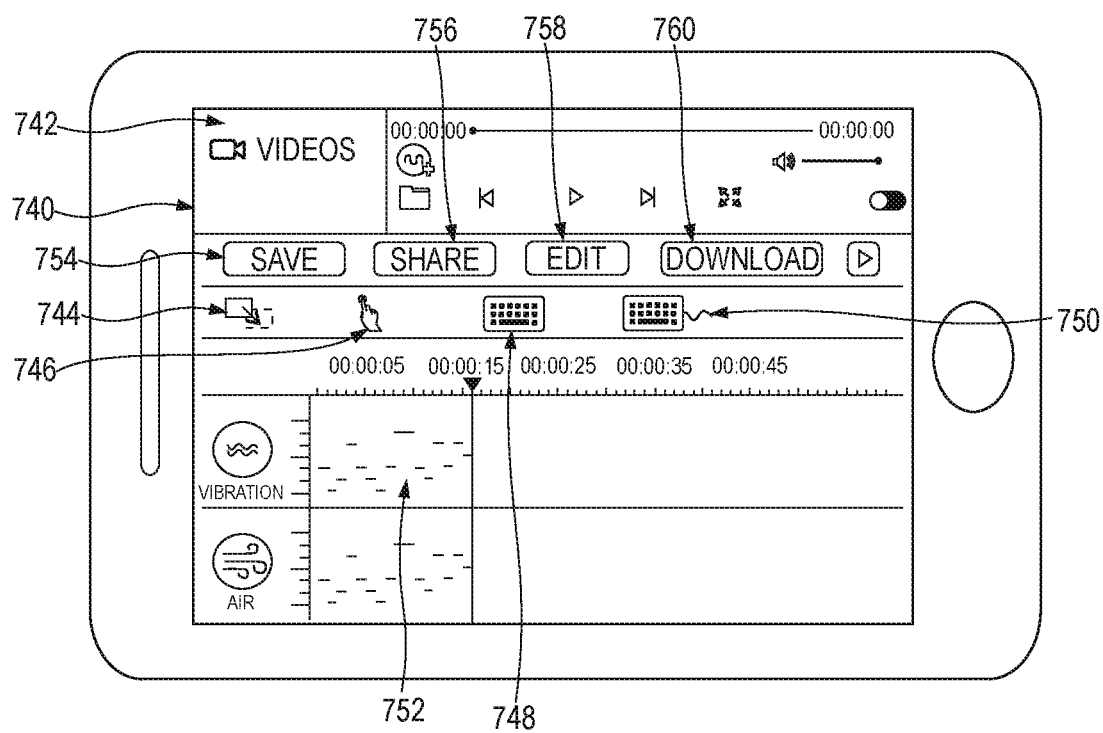

FIGS. 7A to 7C, collectively, represent an example representation of a process to be followed for creating a pattern for a media file with corresponding User Interfaces (UIs), in accordance with an example embodiment of the present disclosure.

A UI 700 displays a media upload page 702 as facilitated by the media application 112. The user 102 can upload a media file for which the user 102 wants to create a pattern using the media upload page 702 of the media application 112. The media upload page 702 displays a select file tab 704. The user 102 can click on the select file tab 704 for uploading a media file from a local drive of the user device 104. Clicking on the select file tab 704 opens a screen (not shown) where drives available on the user device will be displayed. The user selects a drive from the displayed drives in which the media file is placed and then selects the media file that is to be uploaded. The user can also drag and drop the media file that is to be uploaded.

As shown in FIG. 7B, a UI 720 displays a media play page 722 as facilitated by the media application 112. The media play page 722 includes a video player 724 where the media file to be played is shown. The video player 724 also includes a pattern creation icon 726 and an import video icon 728. The user 102 can click on the pattern creation icon 726 for creating the pattern for the media file played on the video player 724 and the user can click on the import video icon 728 for uploading additional videos. Clicking on the pattern creation icon 726 will redirect the user 102 to a pattern creation page 742. The pattern creation page 742 is explained in detail with reference to FIG. 7C.

As shown in FIG. 7C, a UI 740 displays the pattern creation page 742 facilitated by the media application 112. The pattern creation page 742 includes a plurality of pattern creation options in form of icons, such as a drag and drop icon 744, a touch panel icon 746, a virtual keys icon 748 and a keyboard keys icon 750 that can be used by the user 102 for creating the pattern. The user 102 can click on the drag and drop icon 744 in case the user 102 wants to drag and drop the created pattern from a different platform. The user 102 can click on the touch panel icon 746 for drawing the pattern directly on a touch panel provided on the pattern creation page 742. The user 102 can click on the virtual keys icon 748 for using a virtual keyboard for creating the pattern. The user can click on the keyboard keys icon 750 for using the hardware keyboard keys for drawing/creating the pattern.

In an example embodiment, the user 102 uses the keyboard keys for creating the pattern for the media file being played in the UI 740. In a non-limiting example, the user 102 may press the keyboard up-key to turn the pattern up and press the keyboard down-key to turn the pattern down for creating the pattern for the media file. It should be noted that the user 102 can set any other keys on a keyboard to replace the keyboard up key and the keyboard down key for creating the pattern while using the keyboard keys option. The created pattern is then displayed in a section 752 of the pattern creation page 742. The pattern creation page 742 also includes a save button 754, a share button 756, an edit button 758 and a download button 760. The save button 754 can be clicked by the user for saving the created pattern. Clicking on the save button 754 will open a pop-up box where the user 102 can provide the name for the pattern and can provide a saving input by making a selection to save the pattern either as a public pattern or a private pattern. Once the user provides information in the pop-up box, the information along with the pattern is saved in a script file that is further stored either in the user device 104 or in a database associated with the server 110 depending on a saving input provided by the user in the pop-up box. In case the user 102 wants to save the pattern as the public pattern, the user 102 may be required to first perform registration with the media application 112 before saving the pattern as the public pattern in case the user 102 is a non-registered user of the media application 112

The share button 756 can be clicked by the user 102 for sharing the created pattern with another person. Clicking on the save button 754 will open a pop-up box where the user 102 can provide an email-id of the person with whom the user 102 wants to share the pattern for sharing the created pattern. The edit button 758 can be clicked by the user 102 for editing the created pattern. Similarly, the download button 760 can be clicked by the user 102 for downloading the pattern on the user device 104.

Figure 8A:
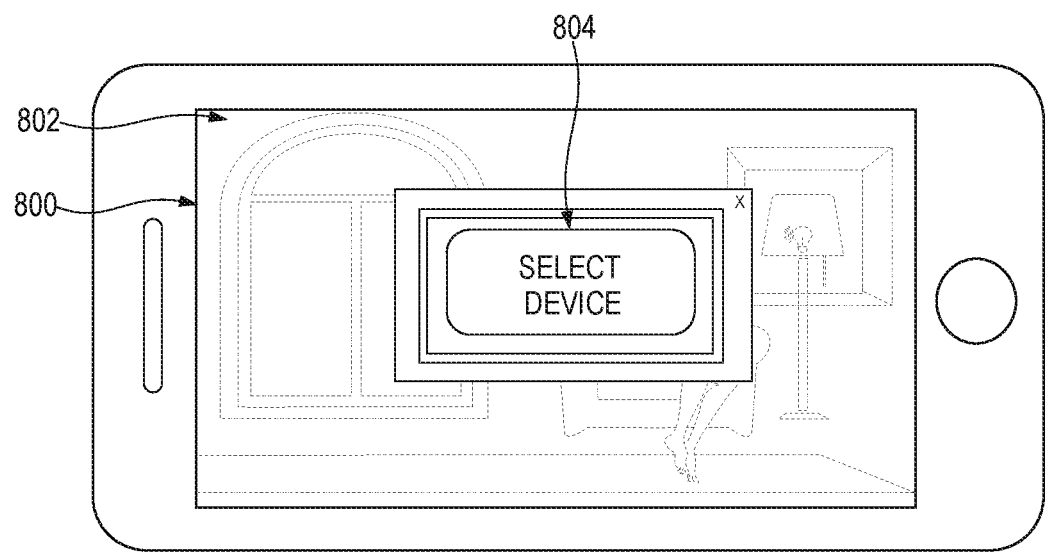
FIGS. 8A to 8C, collectively, represent an example representation of a process to be followed for playing a pattern from a plurality of patterns that are available for the media file while using the adult entertainment device connected with the user device with corresponding UIs, in accordance with an example embodiment of the present disclosure.
Figure 8B:
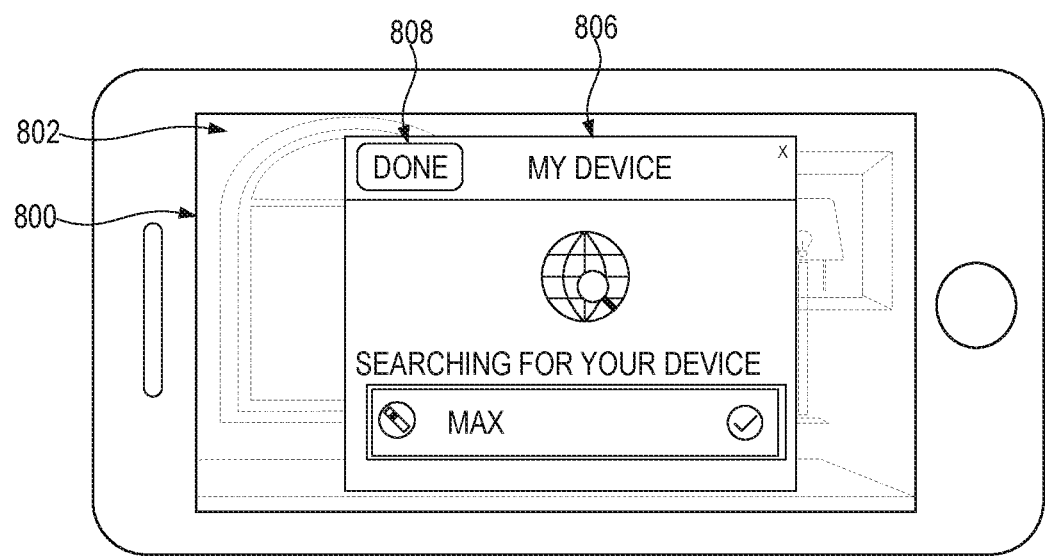
Figure 8C:
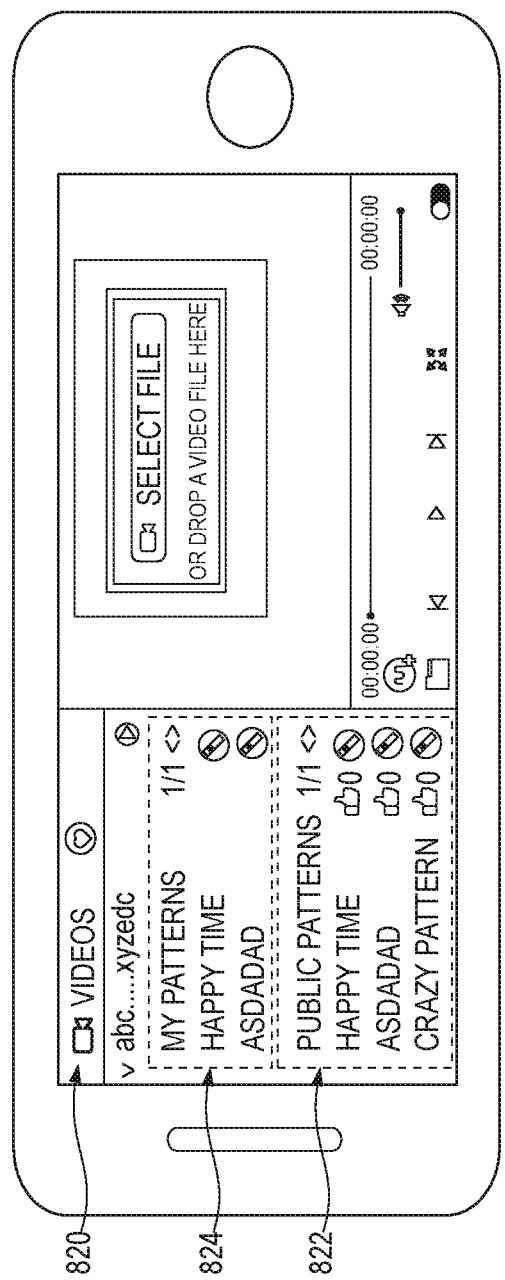

FIGS. 8A to 8C, collectively, represent an example representation of a process to be followed for playing a pattern from a plurality of patterns that are available for a media file while using an adult entertainment device (e.g., the adult entertainment device 106) connected with a user device (e.g., the user device 104) with corresponding User Interfaces (UIs), in accordance with an example embodiment of the present disclosure.

The UI 800 displays a connection page 802 on the media application 112. The user 102 can connect the adult entertainment device 106 with the user device 104 using the connection page 802 of the media application 112. The connection page 802 displays a select device tab 804. The user 102 can click on the select device tab 804 for connecting the adult entertainment device 106 with the user device 104. Clicking on the select device tab 804 will open a pop-up box 806 (shown in FIG. 8B). The pop-up box 806 may display name of the devices that are available for connection with the user device 104. The user 102 can select a device from the available devices based on the device name and can click on a done button 808 provided in the pop-up box 806 to electronically connect the adult entertainment device 106 with the user device 104. Once the adult entertainment device 106 is connected with the user device 104, the user 102 can select a media file that the user 102 wants to play as shown in 7A. Once the user 102 selects the media file, the patterns available for the selected media file are displayed on a pattern display page 820 shown in FIG. 8C.

The pattern display page 820 displays a list of public patterns 822 and a list of private patterns 824 that are available for the selected media file. The user 102 can select any pattern from the list of public patterns 822 and the list of private patterns 824 by double clicking/touching on the pattern. The pattern selected by the user 102 will then be played and the adult entertainment device 106 may start receiving intensity instruction signals corresponding to the selected pattern. The adult entertainment device may then perform customization of one or more adjustable parameters of the adult entertainment device to be in synchronization with the played media file associated with the selected pattern as explained with reference to FIG. 6.

Figure 9:
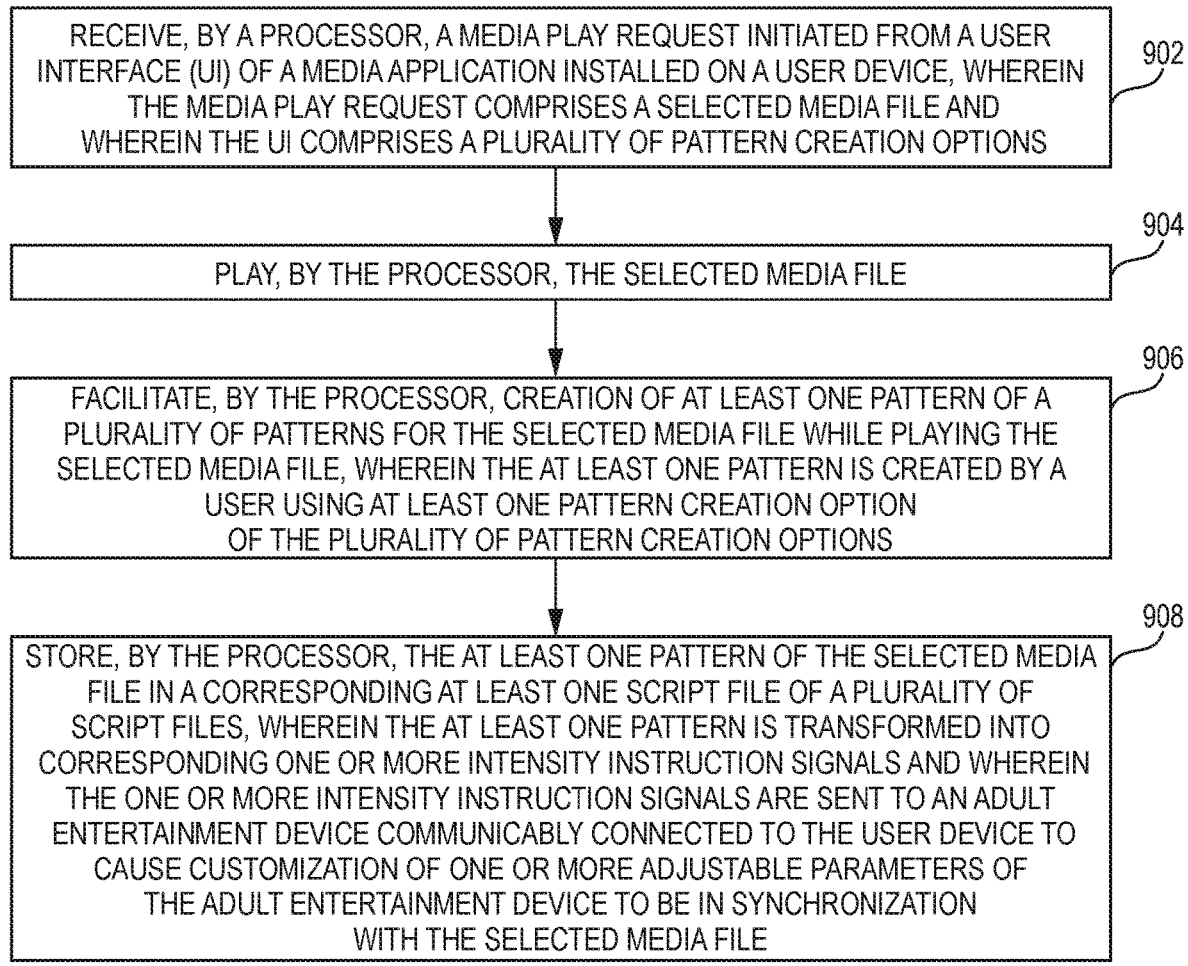
FIG. 9 is a flowchart illustrating a method for creating patterns for the adult entertainment device, in accordance with an example embodiment of the present disclosure.

FIG. 9 is a flowchart illustrating a method 900 for creating a pattern for an adult entertainment device (e.g., the adult entertainment device 106), in accordance with an example embodiment. The operations of the method 900 may be carried out by a server such as the server 110, the system 200 or the electronic device 104. The sequence of operations of the method 900 may not to be necessarily executed in the same order as they are presented. Further, one or more operations may be grouped together and performed in form of a single step, or one operation may have several sub-steps that may be performed in parallel or in sequential manner.

At operation 902, the method 900 includes receiving, by a processor, a media play request initiated from a UI of a media application (e.g., the media application 112) installed on a user device (e.g., the user device 104). A user (e.g., the user 102) may select a media file from a local drive of the user device 104 for which the user 102 wants to create a pattern. The media play request includes the selected media file. The UI includes a plurality of pattern creation options that can be used by the user 102 for creating the pattern for the media file.

At operation 904, the method 900 includes playing, by the processor, the selected media file. The media file included in the media play request is played on the user device 104.

At operation 906, the method 900 includes facilitating, by the processor, a creation of at least one pattern of a plurality of patterns for the selected media file while playing the selected media file. The user creates the at least one pattern of the plurality of patterns using the at least one pattern creation option of the plurality of pattern creation options provided on the UI of the media application 112. The plurality of pattern creation options includes a drag and drop option, a touch panel option, a virtual keys option and a keyboard keys option. While using the drag and drop option, the user 102 can create the pattern using any platform, and the created pattern is dragged and placed in the UI of the media application 112. While using the touch panel option, the user 102 can draw a pattern directly on a touch panel provided in the UI with their fingers and the drawn pattern will be saved as the pattern for the media file. While using the virtual keys option, the user 102 may use keys of a virtual keyboard provided on the UI for creating the pattern. Similarly, in case of the keyboard keys option, the user 102 may use the keyboard keys to create the pattern.

At operation 908, the method 900 includes storing, by the processor, the at least one pattern of the selected media file in a corresponding at least one script file of a plurality of script files. The at least one pattern created by the user 102 is stored in the at least one script file created for the at least one created pattern. The at least one pattern stored in the at least one script file is transformed into corresponding one or more intensity instruction signals while paying of the media file associated with the at least one script file. The one or more intensity instruction signals are then sent to an adult entertainment device 106 communicably connected to the user device 104 to cause customization of one or more adjustable parameters of the adult entertainment device 106 to be in synchronization with the media file being played. The synchronization of the adjustable parameters with the played media file associated with the at least one script file ensures that movements of a character in the played media file are synched with operation of the adult entertainment device 106.

Figure 10:
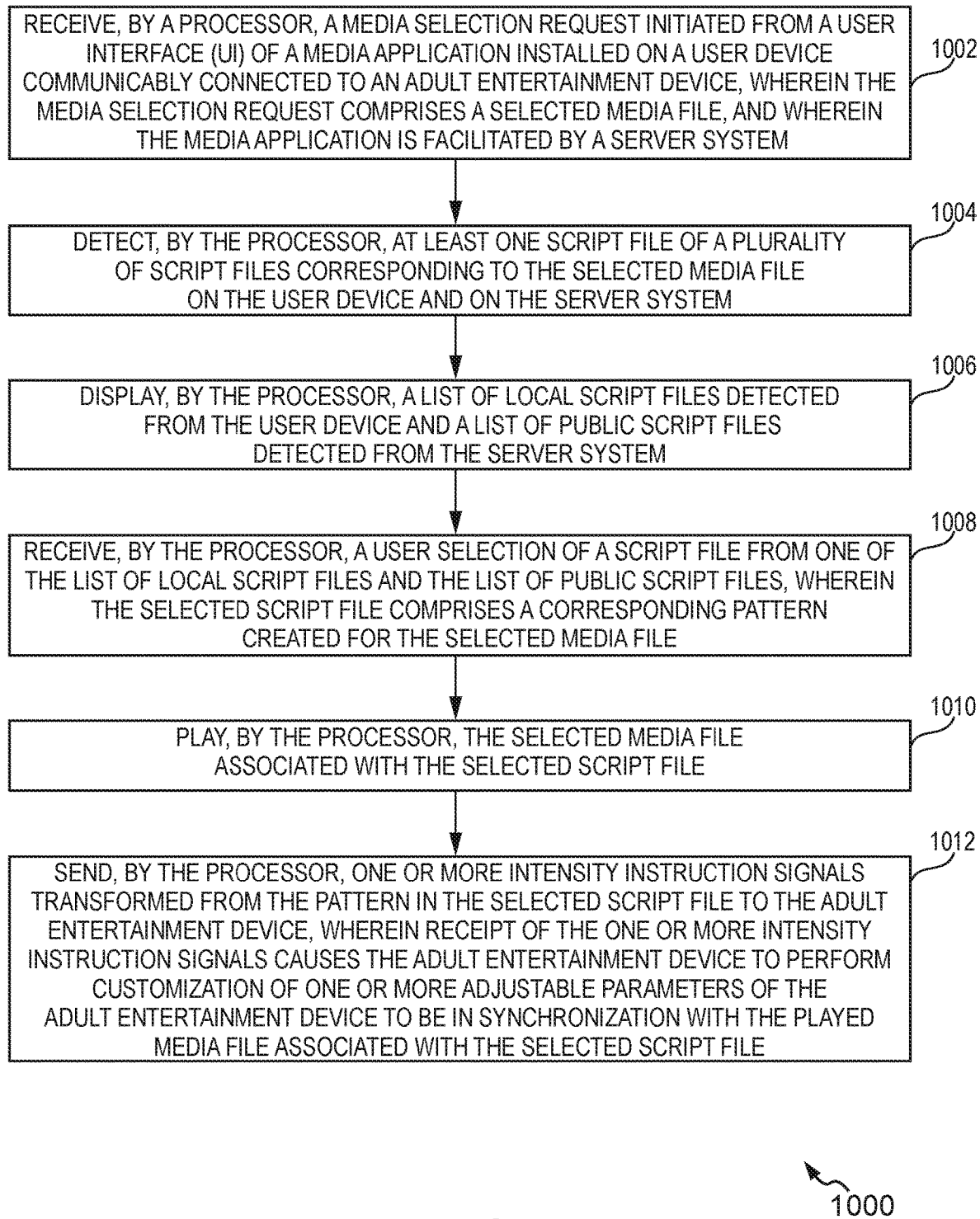
FIG. 10 is a flowchart illustrating another method for playing a pattern of the media file while using the adult entertainment device, in accordance with an example embodiment of the present disclosure.

FIG. 10 is a flowchart illustrating a method 1000 for playing a pattern of a media file while using an adult entertainment device (e.g., the adult entertainment device 106), in accordance with an example embodiment. The operations of the method 1000 may be carried out by a server such as the server 110, the system 200 or the electronic device 104. The sequence of operations of the method 1000 may not to be necessarily executed in the same order as they are presented. Further, one or more operations may be grouped together and performed in form of a single step, or one operation may have several sub-steps that may be performed in parallel or in sequential manner.

At operation 1002, the method 1000 includes receiving, by a processor, a media selection request initiated from a UI of a media application (e.g., the media application 112) installed on a user device (e.g., the user device 104) communicably connected to the adult entertainment device 106. The media selection request includes a selected media file. A user (e.g., the user 102) selects a media file that the user 102 wants to play from a plurality of media files that are available on the user device 104 using the media application 112 that is facilitated by a server system (e.g., the server 110).

At operation 1004, the method 1000 includes detecting, by the processor, at least one script file of a plurality of script files corresponding to the selected media file on the user device and on the server system. The script files associated with the selected media file are detected on a local drive of the user device 104 and a database associated with the server system i.e. the server 110.

At operation 1006, the method 1000 includes displaying, by the processor, a list of local script files detected from the user device and a list of public script files detected from the server system. The script files that are detected from the local drive of the user device are displayed as the list of local script files and the script files that are detected from the database associated with the server system are displayed as the list of public script files.

At operation 1008, the method 1000 includes receiving, by the processor, a user selection of a script file from one of the list of local script files detected and the list of public script files. The user 102 selects the script file that the user 102 wants to play from the displayed list of local script files and the list of public script files. The selected script file includes a corresponding pattern created for the selected media file.

At operation 1010, the method 1000 includes playing, by the processor, the selected media file associated with the selected script file. The media file is played based on the selected script file.

At operation 1012, the method 1000 includes sending, by the processor, one or more intensity instruction signals transformed from the pattern in the selected script file to the adult entertainment device 106. The intensity instruction signals that are created based on the pattern included in the selected script file are sent to the adult entertainment device 106. The adult entertainment device 106, upon receipt of the one or more intensity instruction signals, performs customization of the one or more adjustable parameters of the adult entertainment device 106 to be in synchronization with the played media file associated with the selected script file. Therefore, the user 102 using the adult entertainment device 106 gets a real time feeling of engagement as the movements of a character in the played media are synched with the operation of the adult entertainment device 106.

Figure 11:
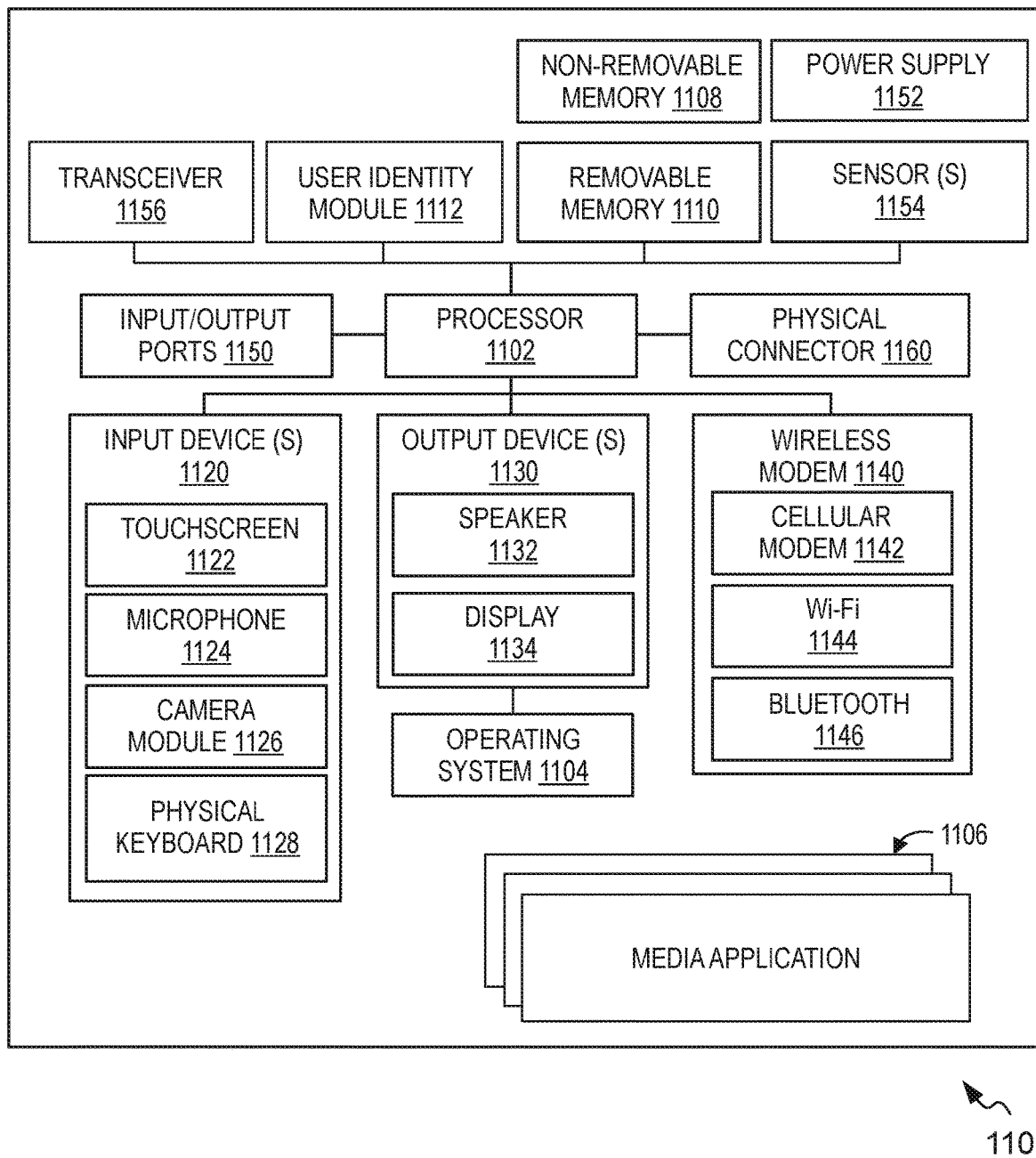
FIG. 11 is a block diagram of an electronic device capable of implementing the various embodiments of the present disclosure, in accordance with an example embodiment.

FIG. 11 shows a simplified block diagram of an electronic device 900 capable of implementing the various embodiments of the present disclosure. The electronic device 1100 may be an example of the electronic devices 104a to 104c or the system 200. It should be understood that the electronic device 1100 as illustrated and hereinafter described is merely illustrative of one type of device and should not be taken to limit the scope of the embodiments. As such, it should be appreciated that at least some of the components described below in connection with the electronic device 1100 may be optional and thus in an example embodiment may include more, less or different components than those described in connection with the example embodiment of the FIG. 11. As such, among other examples, the electronic device 1100 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the electronic device 1100 and provides support for one or more programs such as a media application that implements one or more of the innovative features described herein. The applications 1106 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 1100 includes one or more memory components, for example, a non-removable memory 1108 and/or a removable memory 1110. The non-removable memory 1108 and/or the removable memory 1110 may be collectively known as storage device/module in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104. The electronic device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to, a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN).

The electronic device 1100 can further include one or more input/output ports 1150, a power supply 1152, one or more sensors 1154 for example, an accelerometer, a gyroscope, a compass, a global positioning system sensor (for providing location details) or an infrared proximity sensor for detecting the orientation or motion of the electronic device 1100, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 11, or one or more operations of the methods 900 and 1000 and the sequence flow diagrams 300 and 400 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 12 is a simplified block diagram of a server system 1200, in accordance with one embodiment of the present disclosure. The server system 1200 is an example of the server 110 shown and explained with reference to FIG. 1 or the system 200 explained with reference to FIG. 2. The server system 1200 includes a computer system 1205 and one or more databases, such as a database 1210.

The computer system 1205 includes a processor 1215 for executing instructions. Instructions may be stored in, for example, but not limited to, a memory 1220. The processor 1215 may include one or more processing units (e.g., in a multi-core configuration). The processor 1215 is operatively coupled to a communication interface 1225 such that the computer system 1205 is capable of communicating with a remote device such as an electronic device 1235. Example of the electronic device 1235 may include, but is not limited to, the electronic devices 104a to 104c and the adult entertainment device 106 shown in FIG. 1.

The processor 1215 may also be operatively coupled to the database 1210. The database 1210 is any computer-operated hardware suitable for storing and/or retrieving data. The database 1210 may include multiple storage units such as hard disks and/or solid-state disks in a redundant array of independent disks (RAID) configuration. The database 1210 may include, but not limited to, a storage area network (SAN) and/or a network attached storage (NAS) system.

In some embodiments, the database 1210 is integrated within the computer system 1205. For example, the computer system 1205 may include one or more hard disk drives as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210.

The memory 1220 is a storage device embodied as one or more volatile memory devices, one or more non-volatile memory devices, and/or a combination of one or more volatile memory devices and non-volatile memory devices, for storing micro-contents information and instructions. The memory 1220 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for creating a pattern for a media file. The system facilitates creation of customized patterns for the media file, thereby providing a flexibility of creating pattern that matches with sexual requirement of the user. The system creates the intensity instruction signals that are sent to the adult entertainment device by transforming the created pattern, thereby ensuring synchronization of the operation of the adult entertainment device with the media file being played which further enhances the sexual experience of the user.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks, although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory medium or means that can contain, store, communicate, propagate or transport the instructions for use by or in connection with an instruction execution system, apparatus, or device, such as a computer. A computer-readable medium may include a computer-readable storage medium that may be any medium or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications, as are suited to the particular use contemplated. It is understood that various omissions and substitutions of equivalents are contemplated as circumstances may suggest or render expedient, but such are intended to cover the application and\or implementation without departing from the spirit or scope of the claims.

What is claimed is:

1. A computer-implemented method, comprising:
    receiving, by a processor, a media play request initiated from a User Interface (UI) of a media application installed on a user device, wherein the media play request comprises a selected media file and wherein the UI comprises a plurality of pattern creation options;
    playing, by the processor, the selected media file;
    facilitating, by the processor, creation of at least one pattern of a plurality of patterns for the selected media file while playing the selected media file, wherein the at least one pattern is created by a user using at least one pattern creation option of the plurality of pattern creation options; and
    storing, by the processor, the at least one pattern of the selected media file in a corresponding at least one script file of a plurality of script files, wherein the at least one pattern is transformed into corresponding one or more intensity instruction signals and wherein the one or more intensity instruction signals are sent to an adult entertainment device communicably connected to the user device to cause customization of one or more adjustable parameters of the adult entertainment device to be in synchronization with the selected media file;

wherein the at least one pattern for the selected media file comprises a frequency pattern and an amplitude pattern, and wherein the at least one pattern is created in one of:

a default setting mode enabling the user to create only one of the frequency pattern and the amplitude pattern; and a personalized setting mode enabling the user to create both the frequency pattern and the amplitude pattern.

2. The method as claimed in claim 1, wherein the plurality of script files are stored in the user device associated with the user as a list of local script files.

3. The method as claimed in claim 2, further comprising:

receiving, by the processor, a connection request to communicably connect the adult entertainment device with the user device from the UI, the connection request comprising a device identification (ID) associated with the adult entertainment device;

electronically connecting, by the processor, the adult entertainment device from available one or more adult entertainment devices with the user device based on the device ID;

displaying, by the processor, the plurality of script files associated with the selected media file on the UI, wherein each script file of the plurality of script files corresponds to each pattern of the plurality of patterns created for the selected media file;

facilitating, by the processor, selection of a script file from the plurality of script files;

playing, by the processor, the selected media file associated with the selected script file; and sending, by the processor, one or more intensity instruction signals transformed from a corresponding pattern of the selected script file to the adult entertainment device connected to the user device.

4. The method as claimed in claim 3, wherein receipt of the one or more intensity instruction signals causes the adult entertainment device to customize the one or more adjustable parameters to be in synchronization with the selected media file associated with the selected script file based on the one or more intensity instruction signals.

5. The method as claimed in claim 1, further comprising:

saving, by the processor, the plurality of script files created for the selected media file in a server system associated with the media application as a list of public script files, wherein the list of public script files stored for the selected media file are available for use by a plurality of users of the media application;

facilitating, by the processor, sharing of each script file of the plurality of script files; and facilitating, by the processor, downloading of each script file of the plurality of script files.

6. The method as claimed in claim 5, further comprising:

facilitating, by the processor, editing of each pattern of the plurality of patterns that is stored corresponding to each script file of the plurality of script files associated with selected media file.

7. The method as claimed in claim 1, wherein the one or more adjustable parameters comprise one or more of:

a vibration amplitude;
a vibration frequency;
a rotation frequency;
a contraction amplitude; and
a contraction frequency.

8. The method as claimed in claim 7, wherein the one or more intensity instruction signals comprise one or more of:

at least one frequency intensity instruction signal to customize at least one of: the vibration frequency, the rotation frequency, and the contraction frequency of the adult entertainment device; and at least one amplitude intensity instruction signal to customize at least one of: the vibration amplitude, and the contraction amplitude of the adult entertainment device.

9. The method as claimed in claim 8, wherein the adult entertainment device comprises an electromagnet for generating a magnetic field based on the at least one amplitude intensity instruction signal to customize at least one of: the vibration amplitude, and the contraction amplitude of the adult entertainment device.

10. The method as claimed in claim 1, wherein the plurality of pattern creation options comprises one or more of:

a drag and drop option;
a touch panel option;
a virtual keys option; and
a keyboard keys option.

11. A system, comprising:

a communication interface configured to receive a media play request initiated from a User Interface (UI) of a media application installed on a user device, wherein the media play request comprises a selected media file and wherein the UI comprises a plurality of pattern creation options;

a memory comprising executable instructions; and a processor communicably coupled to the communication interface and configured to execute the instructions to cause the system to at least:

play the selected media file;

facilitate creation of at least one pattern of a plurality of patterns for the selected media file while playing the selected media file, wherein the at least one pattern is created by a user using at least one pattern creation option of the plurality of pattern creation options; and store the at least one pattern of the selected media file in a corresponding at least one script file of a plurality of script files, wherein the at least one pattern is transformed into corresponding one or more intensity instruction signals and wherein the one or more intensity instruction signals are sent to an adult entertainment device communicably connected to the user device to cause customization of one or more adjustable parameters of the adult entertainment device to be in synchronization with the selected media file;

wherein the at least one pattern for the selected media file comprises a frequency pattern and an amplitude pattern, and wherein the at least one pattern is created in one of:

a default setting mode enabling the user to create only one of the frequency pattern and the amplitude pattern; and a personalized setting mode enabling the user to create both the frequency pattern and the amplitude pattern.

12. The system as claimed in claim 11, wherein the plurality of script files are stored in the user device associated with the user as a list of local script files.

13. The system as claimed in claim 12, wherein the system is further caused to:

receive a connection request to communicably connect the adult entertainment device with the user device from the UI, the connection request comprising a device identification (ID) associated with the adult entertainment device;

electronically connect the adult entertainment device from available one or more adult entertainment devices with the user device based on the device ID;

display the plurality of script files associated the selected media file on the UI, wherein each script file of the plurality of script files corresponds to each pattern of the plurality of patterns created for the selected media file;

facilitate selection of a script file from the plurality of script files;

play the selected media file associated with the selected script file; and send one or more intensity instruction signals transformed from a corresponding pattern of the selected script file to the adult entertainment device connected to the user device.

14. The system as claimed in claim 13, wherein receipt of the one or more intensity instruction signals causes the adult entertainment device to customize the one or more adjustable parameters to be in synchronization with the selected media file associated with the selected script file based on the one or more intensity instruction signals.

15. The system as claimed in claim 11, wherein the one or more adjustable parameters comprise one or more of:
a vibration amplitude;
a vibration frequency;
a rotation frequency;
a contraction amplitude; and
a contraction frequency.

16. The system as claimed in claim 15, wherein the one or more intensity instruction signals comprise one or more of:
at least one frequency intensity instruction signal to customize at least one of: the vibration frequency, the rotation frequency, and the contraction frequency of the adult entertainment device; and
at least one amplitude intensity instruction signal to customize at least one of: the vibration amplitude, and the contraction amplitude of the adult entertainment device.

17. The system as claimed in claim 16, wherein the adult entertainment device comprises an electromagnet for generating a magnetic field based on the at least one amplitude intensity instruction signal to customize at least one of: the vibration amplitude, and the contraction amplitude of the adult entertainment device.

18. A computer-implemented method, comprising:

receiving, by a processor, a media selection request initiated from a User Interface (UI) of a media application installed on a user device communicably connected to an adult entertainment device, wherein the media selection request comprises a selected media file, and wherein the media application is facilitated by a server system;

detecting, by the processor, at least one script file of a plurality of script files corresponding to the selected media file on the user device and on the server system;

displaying, by the processor, a list of local script files detected from the user device and a list of public script files detected from the server system;

receiving, by the processor, a user selection of a script file from one of:

the list of local script files; and the list of public script files, wherein the selected script file comprises a corresponding pattern created for the selected media file;

playing, by the processor, the selected media file associated with the selected script file; and sending, by the processor, one or more intensity instruction signals transformed from the corresponding pattern in the selected script file to the adult entertainment device, wherein receipt of the one or more intensity instruction signals causes the adult entertainment device to perform customization of one or more adjustable parameters of the adult entertainment device to be in synchronization with the played media file associated with the selected script file;

wherein the at least one pattern for the selected media file comprises a frequency pattern and an amplitude pattern, and wherein the at least one pattern is created in one of:

a default setting mode enabling the user to create only one of the frequency pattern and the amplitude pattern; and a personalized setting mode enabling the user to create both the frequency pattern and the amplitude pattern.

* * * * *